US011070302B2

(12) United States Patent
Kang et al.

(10) Patent No.: US 11,070,302 B2
(45) Date of Patent: Jul. 20, 2021

(54) MEASUREMENT AND REPORT FOR CROSS-LINK INTERFERENCE MANAGEMENT BASED ON SIGNAL STRENGTH

(71) Applicant: Telefonaktiebolaget LM Ericsson (publ), Stockholm (SE)

(72) Inventors: Du Ho Kang, Upplands Väsby (SE); Sorour Falahati, Stockholm (SE); Sebastian Faxér, Järfälla (SE); Robert Mark Harrison, Grapevine, TX (US); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 78 days.

(21) Appl. No.: 16/331,182

(22) PCT Filed: Aug. 7, 2018

(86) PCT No.: PCT/SE2018/050797
§ 371 (c)(1),
(2) Date: Mar. 7, 2019

(87) PCT Pub. No.: WO2019/032021
PCT Pub. Date: Feb. 14, 2019

(65) Prior Publication Data
US 2019/0260486 A1 Aug. 22, 2019

Related U.S. Application Data

(60) Provisional application No. 62/544,495, filed on Aug. 11, 2017.

(51) Int. Cl.
H04B 17/345 (2015.01)
H04B 17/327 (2015.01)
(Continued)

(52) U.S. Cl.
CPC ......... *H04B 17/345* (2015.01); *H04B 17/327* (2015.01); *H04L 5/0007* (2013.01);
(Continued)

(58) Field of Classification Search
CPC ........... H04W 72/082; H04W 72/0446; H04W 24/10; H04B 17/327; H04B 17/345; H04L 5/0007
See application file for complete search history.

(56) References Cited

U.S. PATENT DOCUMENTS

2013/0322277 A1  12/2013  Vanganuru et al.
2014/0219232 A1*  8/2014  Takeda .................. H04W 16/32
                                                370/329

(Continued)

FOREIGN PATENT DOCUMENTS

EP   3 054 719 A1   8/2016
EP   3 068 179 A1   9/2016
(Continued)

OTHER PUBLICATIONS

PCT International Search Report for International application No. PCT/SE2018/050797—dated Dec. 14, 2018.
(Continued)

*Primary Examiner* — Jianye Wu
(74) *Attorney, Agent, or Firm* — Baker Botts, LLP

(57) ABSTRACT

A method in a user equipment (UE) (110B) is disclosed. The method comprises obtaining (404) an indication of one or more sets of time and frequency resources to be measured by the UE. The method comprises performing (408) one or more measurements on each of the one or more sets of time and frequency resources. The method comprises reporting (412), to a network node (115), a measurement value for each of the one or more sets of time and frequency resources, the measurement value indicative of cross-link interference
(Continued)

at the UE due to transmissions by one or more different UEs (110A, 110C, 110D, 110E).

25 Claims, 11 Drawing Sheets

(51) Int. Cl.
*H04L 5/00* (2006.01)
*H04W 24/10* (2009.01)
*H04W 72/04* (2009.01)
*H04W 72/08* (2009.01)

(52) U.S. Cl.
CPC ....... *H04W 24/10* (2013.01); *H04W 72/0446* (2013.01); *H04W 72/082* (2013.01)

(56) References Cited

U.S. PATENT DOCUMENTS

| | | | |
|---|---|---|---|
| 2018/0323887 A1 | 11/2018 | Azarian Yazdi et al. | |
| 2018/0323916 A1* | 11/2018 | Yang | H04L 5/0053 |
| 2019/0273600 A1* | 9/2019 | Wang | H04B 17/345 |
| 2020/0112420 A1* | 4/2020 | Xu | H04W 24/10 |

FOREIGN PATENT DOCUMENTS

| | | |
|---|---|---|
| WO | 2013 025158 A1 | 2/2013 |
| WO | 2015 023227 A1 | 2/2015 |
| WO | 2015 043633 A1 | 4/2015 |
| WO | 2017 126920 A1 | 7/2017 |
| WO | 2018 126792 A1 | 7/2018 |
| WO | 2018 128297 A1 | 7/2018 |

OTHER PUBLICATIONS

PCT Written Opinion of the International Searching Authority for International application No. PCT/SE2018/050797—Dec. 14, 2018.
Review Notice issued by the TW Ministry of Economic Affairs and Intellectual Property Office for Patent application No. 107127995—dated Apr. 19, 2019.
Extended European Search Report issued for Application No./Patent No. 18844489.7-1215/3665929 PCT/SE2018050797—dated Mar. 29, 2021.
3GPP TSG RAN WG1 Meeting #88; Athens, Greece; Title: Overview of Duplexing and Cross-link Interference Mitigation; Source: ZTE, ZTE Microelectronics (R1-1701613)—Feb. 13-17, 2017.
3GPP TSG RAN WG1 Meeting #89; Hangzhou, China; Source: Huawei, HiSilicon; Title: UE-to-UE measurement for cross-link interference mitigation (R1-1706911)—May 15-19, 2017.
3GPP TSG RAN WG1 Meeting NR Ad-Hoc#2; Qingdao, P.R. China; Title: UE-to-UE measurement as an enabler for CLI mitigation schemes; Source: ZTE (R1-1710128)—Jun. 27-30, 2017.

* cited by examiner

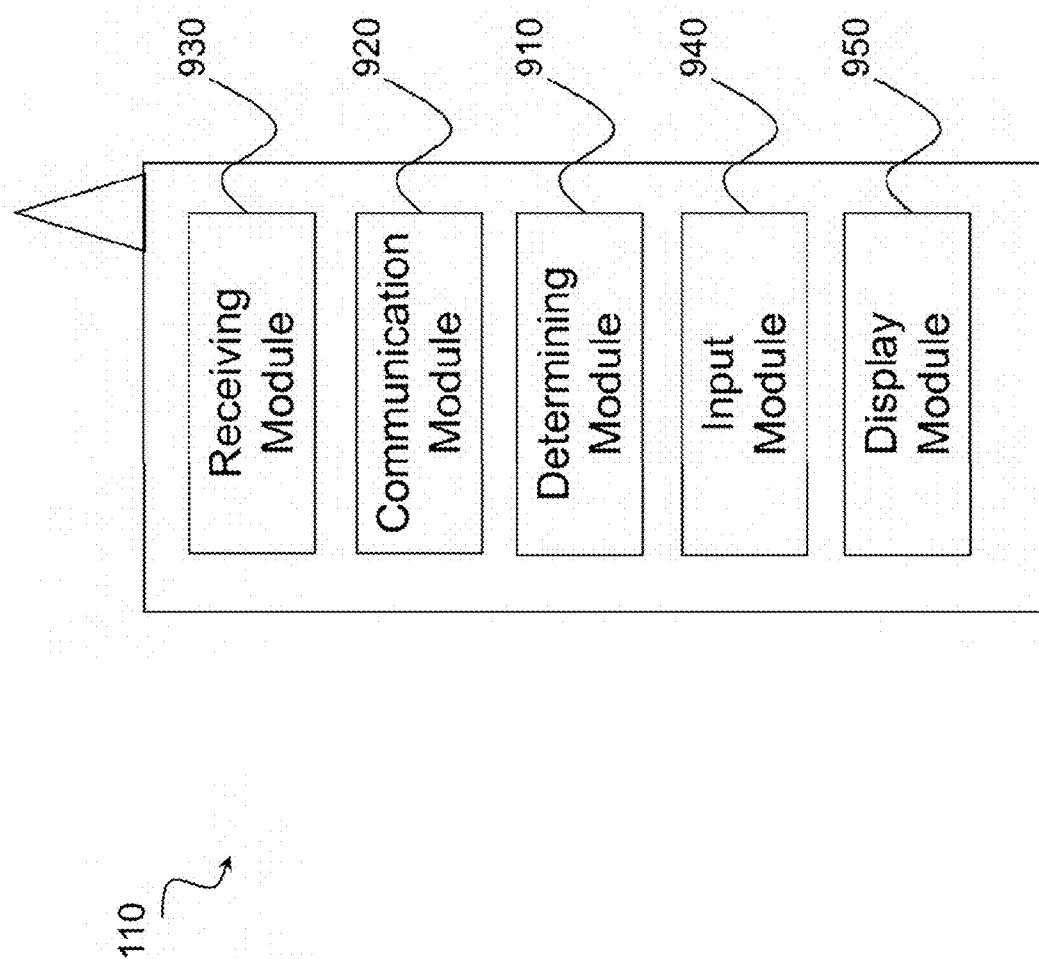

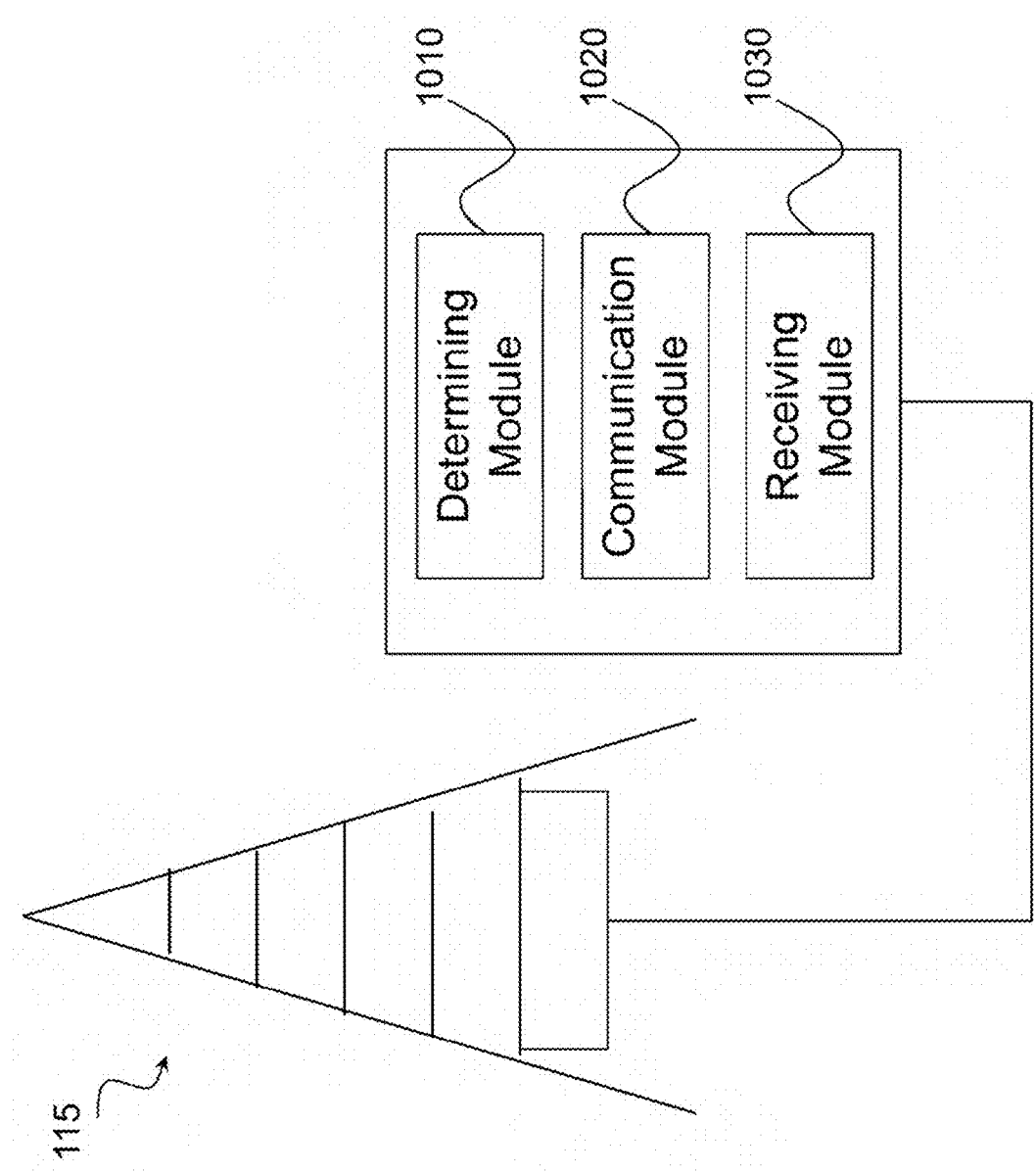

MEASUREMENT AND REPORT FOR CROSS-LINK INTERFERENCE MANAGEMENT BASED ON SIGNAL STRENGTH

PRIORITY

This nonprovisional application is a U.S. National Stage Filing under 35 U.S.C. § 371 of International Patent Application Ser. No. PCT/SE2018/050,797 filed Aug. 7, 2018 and entitled "MEASUREMENT AND REPORT FOR CROSS-LINK INTERFERENCE MaNAGEMENT BASED ON SIGNAL STRENGTH" which claims priority to U.S. Provisional Patent Application Ser. No. 62/544,495 filed Aug. 11, 2017 both of which are hereby incorporated by reference in their entirety.

TECHNICAL FIELD

The present disclosure relates, in general, to wireless communications and, more particularly, to measurement and reporting for cross-link interference management based on signal strength.

BACKGROUND

New Radio (NR) design is based on a flexible structure where any time domain resource for transmission can be allocated for downlink (DL) or uplink (UL) (or a combination of both). If the DL and UL transmissions occur on different carriers, it resembles the Frequency Division Duplex (FDD) type of operation, as in Long Term Evolution (LTE). If the DL and UL transmissions occur on the same carrier, however, it resembles the Time Division Duplex (TDD) type of operation in LTE. Due to the built-in flexible design in NR, the NR operation is sometimes referred to as dynamic TDD operation.

Traditional LTE technology only supports static TDD, where time domain resources are split between DL and UL based on a long-term configuration or flexible TDD operation (where the changes in the DL and UL configuration can be made only over a period of 5 ms). NR, in contrast, is based on the ability to flexibly choose the direction of transmission in periods of 1 ms or less. As a result, dynamic TDD operation enables NR to maximally utilize available radio resources in the most efficient way for both traffic directions.

Although dynamic TDD brings significant performance gain at low to medium loads, the performance benefits become smaller as the traffic load increases. This is due to cross-link interference.

FIG. 1A illustrates an example of the cross-link interference issue with NR dynamic TDD. More specifically, FIG. 1 illustrates two network nodes 115-1 and 115-2 (for example, access points (APs)), and two wireless devices 110-1 and 110-2 (e.g., user equipment (UEs)). Network nodes 115-1 and 115-2 support communications to one or more wireless devices 110. Although the description of FIG. 1 uses access points as an example of network nodes 115, the network nodes in the example of FIG. 1 could be any kind of node, such as a gNodeB (gNB) in a $5^{th}$ Generation (5G) NR network as being specified in the $3^{rd}$ Generation Partnership Project (3GPP).

In the example of FIG. 1A, network node 115-1 is transmitting in the DL to wireless device 110-1 (as depicted by solid arrow 2 in FIG. 1A). Wireless device 110-2, meanwhile, is transmitting in the UL to network node 115-2 (as depicted by solid arrow 4 in FIG. 1A). In such a scenario (i.e., where two cells have different traffic directions), very strong cross-link interference may result. For instance, in the example illustrated in FIG. 1A, wireless device 110-1 experiences strong cross-link interference in the DL from wireless device 110-2, which can be closer than the serving network node 115-1. The cross-link interference experienced by wireless device 110-1 due to transmissions by wireless device 110-2 is depicted by dashed arrow 6. Additionally, network node 115-2 will also experience cross-link interference from network node 115-1, because network node 115-1 is transmitting in the DL. The cross-link interference experienced by network node 115-2 due to transmissions by network node 115-1 is depicted by dashed arrow 8.

FIG. 1B illustrates another example of the cross-link interference issue with NR dynamic TDD. More particularly, FIG. 1B illustrates DL and UL transmissions by two cells, Cell 1 and Cell 2 over time (illustrated by solid arrow 18). As can be seen in FIG. 1B, transmissions in Cell 1 and Cell 2 are not using the same UL/DL configuration. For example, at time instances 11 and 12, transmissions in Cell 1 are occurring in the UL, while Cell 2 transmissions are occurring in the DL. At time instances 13 and 14, however, transmissions in Cell 1 are occurring in the DL, while transmissions in Cell 2 are occurring in the UL. As noted above, when two cells have different traffic directions, very strong cross-link interference can result. The cross-link interference that results can cause errors in transmissions, as depicted in the example of FIG. 1B. In particular, at time instances 11 and 12, cross-link interference from the UL transmissions in Cell 1 cause errors in the DL transmissions of Cell 2. At time instances 13 and 14, cross-link interference from the UL transmissions in Cell 2 cause errors in the DL transmissions of Cell 1.

At high loads, this cross-link interference is the key impediment to performance gains from dynamic TDD operation as compared to static TDD. Existing approaches to minimize cross-link interference involve defining signaling between network nodes in order to exchange information regarding the sources and the levels of interference. However, real-time signaling usually requires overhead and complexity in equipment. Therefore, a more intelligent solution for cross-link interference management without inter-cell signaling is needed.

U.S. Provisional Patent Application No. 62/421,740 considers fully distributed interference management without inter-cell signaling and measurement methods in order to employ dynamic switching between static duplex and flexible duplex. The dynamic switching is done based on the buffer status and presence or absence of bi-directional traffic. Variants of this solution are considered in International Patent Application No. PCT/IB2018/050,135 (published as WO2018/127,854) and International Patent Application No. PCT/SE2018/050,114 (which claims priority to U.S. Provisional Patent Application Ser. No. 62/458,349) by introducing coordination. International Patent Application No. PCT/IB2018/053,362 considers a solution where the switch between dynamic TDD and static TDD is based on the presence or absence of bidirectional traffic as well as measurements made at the UE and/or the AP. International Patent Application No. PCT/SE2018/050,582 teaches triggering conditions and inter-cell signaling from a victim cell to (an) aggressor cells in order to control aggressor cells to mitigate UE-to-UE cross-link interference.

In NR, there is a sounding reference signal (SRS) transmitted from the UE. The main purpose of the SRS is for estimating channel status in all or part of carrier bandwidth in a different time granularity. In NR, SRS can be UE-specifically configured by allocating a different time (e.g., slot, symbol), frequency (sub-band or comb number), reference signal sequence, or cyclic shift.

FIG. 2 illustrates an example of frequency division multiplexing (FDM) of multiple SRS transmissions from different UEs. In the example of FIG. 2, time is shown on the x-axis and frequency is shown on the y-axis. SRS 202 is shown as a set of time-frequency resources. In particular, FIG. 2 illustrates an example of FDM multiplexing of multiple SRS transmissions from different UEs for the Comb-4 case.

In NR, data transmissions by the UE carried by the Physical Uplink Shared Channel (PUSCH) also contain a demodulation reference signal (DMRS) that is used by the gNB to perform channel estimation in order to demodulate and decode the data. Unlike the SRS, the DMRS are not transmitted without the transmission of any associated data transmissions.

SUMMARY

According to one example embodiment, a method in a UE is disclosed. The method comprises obtaining an indication of one or more sets of time and frequency resources to be measured by the UE. The method comprises performing one or more measurements on each of the one or more sets of time and frequency resources. The method comprises reporting, to a network node, a measurement value for each of the one or more sets of time and frequency resources, the measurement value indicative of cross-link interference at the UE due to transmissions by one or more different UEs.

In certain embodiments, the one or more measurements may be performed based on received energy. In certain embodiments, the one or more measurements may be performed without knowledge of any sequences associated with the one or more sets of time and frequency resources.

In certain embodiments, performing one or more measurements on each of the one or more sets of time and frequency resources mimic comprise performing a Received Signal Strength Indicator (RSSI) measurement on each of the one or more sets of time and frequency resources. In certain embodiments, the RSSI measurement may comprise an average of total received power observed in a set of time and frequency resources. In certain embodiments, the RSSI measurement may comprise a single-shot measurement performed over a set of time and frequency resources in one slot, and the reported measurement value may be a value of the single-shot measurement. In certain embodiments, the RSSI measurement may comprise a set of measurements performed over a set of slots, each slot carrying one of the one or more time and frequency resource sets, and the reported measurement value may comprise a set of measurements with one reported RSSI value per slot. In certain embodiments, the RSSI measurement may comprise a measurement performed over a set of time and frequency resources that spans multiple slots, and the reported measurement value may comprise an averaged measurement over the multiple slots. In certain embodiments, the RSI measurement may comprise a measurement performed over a set of time and frequency resources that occurs in a pre-configured set of slots, and the reported measurement value may comprise a measured value for a slot in the pre-configured set of slots if the measured value satisfies a reporting trigger.

In certain embodiments, the obtained indication of one or more sets of time and frequency resources to be measured by the UE may comprise one or more of: a sub-band index; a comb number corresponding to a set of time and frequency resources in a sub-band; a set of Orthogonal Frequency Division Multiplexing (OFDM) symbols in a slot; and a set of slots. In certain embodiments, the method may comprise deriving the one or more sets of time and frequency resources to be measured by the UE based on the obtained indication.

In certain embodiments, the method may comprise obtaining a configuration for a Sounding Reference Signal (SRS) transmission by the UE and transmitting the SRS according to the obtained configuration.

Also disclosed is a UE. The UE comprises a receiver, a transmitter, and processing circuitry coupled to the receiver and the transmitter. The processing circuitry is configured to obtain an indication of one or more sets of time and frequency resources to be measured by the UL. The processing circuitry is configured to perform one or more measurements on each of the one or more sets of time and frequency resources. The processing circuitry is configured to report, to a network node, a measurement value for each of the one or more sets of time and frequency resources, the measurement value indicative of cross-link interference at the UE due to transmissions by one or more different UEs.

Also disclosed is a computer program, the computer program comprising instructions configured to perform the above-described method in a UE.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a UE.

Also disclosed is a method in a network node. The method comprises configuring a first UE to perform one or more measurements on one or more sets of time and frequency resources. The method comprises receiving a measurement value from the first UE for each of the one or more sets of time and frequency resources, the measurement value indicative of cross-link interference at the first UE due to transmissions by one or more different UEs.

In certain embodiments, the method may comprise configuring the one or more different UEs to transmit a signal on the one or more sets of time and frequency resources. In certain embodiments, the one or more different UEs are configured to transmit an SRS.

In certain embodiments, the method may comprise receiving, from a neighboring network node, an SRS transmission configuration for the one or more different UEs, the SRS transmission configuration indicating that the one or more different UEs are configured to perform SRS transmissions on the one or more sets of time and frequency resources. The first UE may be configured to perform one or more measurements on the one or more sets of time and frequency resources according to the received SRS transmission configuration.

In certain embodiments, the method may comprise estimating, based on the received measurement value, an amount of cross-link interference at the first UE due to transmissions by the one or more different UEs. In certain embodiments, the method may comprise scheduling the one or more different UEs such that the amount of cross-link interference at the first UE is reduced.

In certain embodiments, configuring the first UE to perform one or more measurements on the one or more sets of time and frequency resources may comprise signaling an indication of the one or more sets of time and frequency resources to be measured by the first UE. In certain embodiments, the indication may comprise one or more of: a sub-band index; a comb number corresponding to a set of time and frequency resources in a sub-band; a set of OFDM symbols in a slot; and a set of slots.

In certain embodiments, configuring the first UE to perform one or more measurements on the one or more sets of time and frequency resources may comprise configuring the first UE to perform the one or more measurements based on received energy. In certain embodiments, configuring the first UE to perform one or more measurements on the one or more sets of time and frequency resources may comprise configuring the first UE to perform the one or more measurements without knowledge of any sequences associated with the ore or more sets of time and frequency resources. In certain embodiments, configuring the first UE to perform one or more measurements on the one or more sets of time and frequency resources may comprise configuring the first UE to perform an RSSI measurement on the one or more sets of time and frequency resources. In certain embodiments, the RSSI measurement may comprise an average of total received power observed in a set of time and frequency resources.

In certain embodiments, configuring the first UE to perform one or more measurements on the one or more sets of time and frequency resources may comprise configuring the first UE to perform a set of measurements over a set of slots, each slot carrying one of the one or more time and frequency resource sets. The received measurement value may comprise a set of measurements with one reported RSSI value per slot.

In certain embodiments, configuring the first UE to perform one or more measurements on the one or more sets of time and frequency resources may comprise configuring the first UE to perform a measurement over a set of time and frequency resources that spans multiple slots. The received measurement value may comprise an averaged measurement over the multiple slots.

Also disclosed is a network node. The network node comprises a receiver, a transmitter, and processing circuitry coupled to the receiver and the transmitter. The processing circuitry is configured to configure a first UE to perform one or more measurements on one or more sets of time and frequency resources. The processing circuitry is configured to receive a measurement value from the first UE for each of the one or more sets of time and frequency resources, the measurement value indicative of cross-link interference at the first UE due to transmissions by one or more different UEs.

Also disclosed is a computer program, the computer program comprising instructions configured to perform the above-described method in a network node.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a network node.

Certain embodiments of the present disclosure may provide one or more technical advantages. For example, certain embodiments may advantageously provide a low complexity UE-to-UE interference measurement. As another example, certain embodiments may advantageously identify aggressor UEs with a low-complexity in the UE receiver and with lower complexity signaling from the network. As still another example, certain embodiments may advantageously provide aggressor UE information to a network to control severe UE-to-UE interference and enable techniques to improve overall system performance. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 9 is a block schematic of an exemplary wireless device, in accordance with certain embodiments; and FIG. 10 is a block schematic of an exe exemplary network node, in accordance with certain embodiments.

DETAILED DESCRIPTION

Figure 1A:
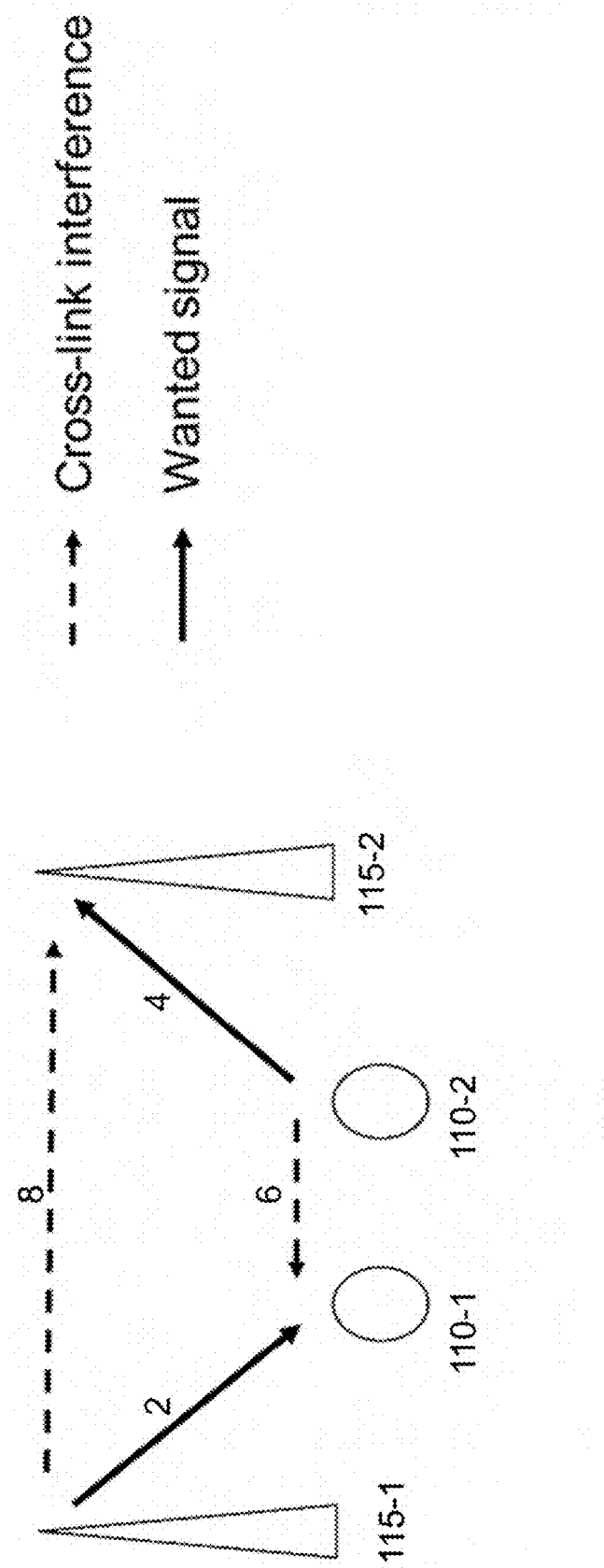
FIG. 1A illustrates an example of the cross-link interference issue in NR dynamic TDD.
Figure 1B:
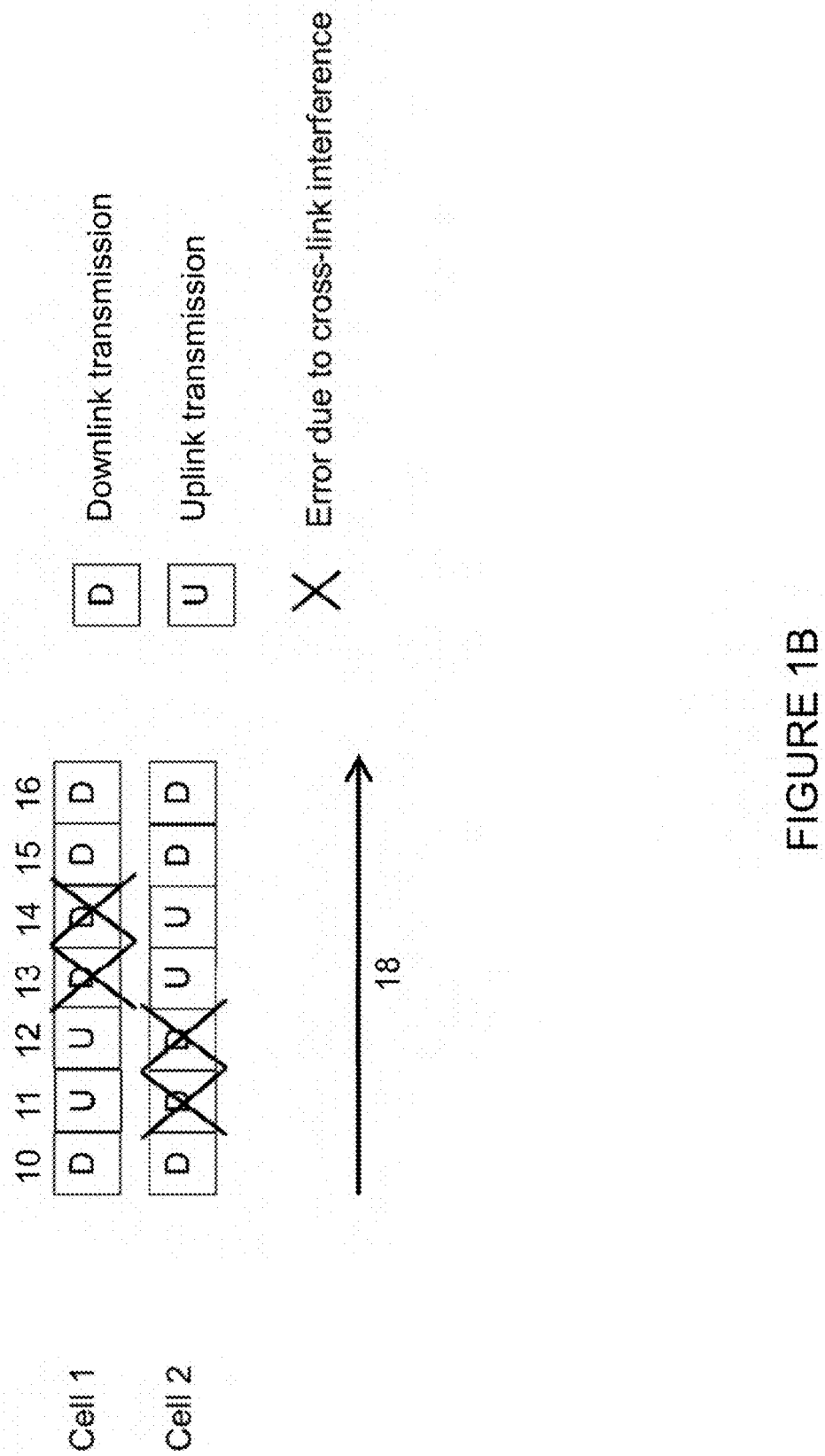
FIG. 1B illustrates another example of the cross-link interference issue in NR dynamic TDD.

As described above, dynamic TDD brings significant performance gain at low to medium loads. The performance benefits, however, become smaller as the traffic load increases. This decrease in performance gain at high load is a result of cross-link interference, which is the key impediment to performance gains from dynamic TDD operation at higher loads. Existing approaches to minimize the cross-link interference involve defining signaling between network nodes in order to exchange information regarding the sources and the levels of interference. These approaches, however, require significant overhead and complexity in equipment. Thus, a more intelligent solution for cross-link interference management without inter-cell signaling is required.

The present disclosure contemplates various embodiments that may address these and other deficiencies associated with existing approaches. In certain embodiments, methods of measurement for wireless device-to-wireless device (e.g., UE-to-UE) interference management are proposed. In certain embodiments, the methods include a new measurement approach based on received energy that does not require knowledge of specific sequences, which can be used to differentiate the interference from different wireless devices (e.g., UEs).

According to one example embodiment, a method in a wireless device (e.g., UE) is disclosed. The wireless device obtains an indication of one or more sets of time and frequency resources to be measured by the wireless device. In certain embodiments, the indication may be one or more of a sub-band index, a comb number corresponding to a set of time and frequency resources in a sub-band; a set of Orthogonal Frequency Division Multiplexing (OFDM) symbols in a slot; and a set of slots. In certain embodiments, the wireless device may derive the one or more sets of time and frequency resources to be measured by the wireless device based on the obtained indication.

The wireless device performs one or more measurements (e.g., one or more Received Signal Strength Indicator (RSSI) measurements) on each of the one or more sets of time and frequency resources. In certain embodiments, the one or more measurements are performed based on received energy. In certain embodiments, the one or more measurements are performed without knowledge of any sequences associated with the one or more sets of time and frequency resources.

The wireless device reports, to a network node, a measurement value for each of the one or more sets of time and frequency resources. The measurement value is indicative of cross-link interference at the wireless device due to transmissions by one or more different wireless devices.

According to another example embodiment, a method in a network node (e.g., gNB) is disclosed. The network node configures a first wireless device to perform one or more measurements (e.g., one or more RSSI measurements) on one or more sets of time and frequency resources. In certain embodiments, the network node may signal an indication of the one or more sets of time and frequency resources to be measured by the first wireless device (e.g., one or more of a sub-band index, a comb number corresponding to a set of time and frequency resources in a sub-band, a set of OFDM symbols in a slot, and a set of slots).

In certain embodiments, the network node may configure one or more different wireless devices (e.g., one or more different UEs) to transmit a signal (e.g., a Sounding Reference Signal (SRS)) on the one or more sets of time and frequency resources.

The network node receives a measurement value from the first wireless device for each of the one or more sets of time and frequency resources. The measurement value is indicative of cross-link interference at the first wireless device due to transmissions by one or more different wireless devices. In certain embodiments, the network node may estimate, based on the received measurement value, an amount of cross-link interference at the first wireless device due to transmissions by the one or more different wireless devices. In certain embodiments, the network node may schedule the one or more different wireless devices such that the amount of cross-link interference at the first wireless device is reduced.

Certain embodiments of the present disclosure may provide one or more technical advantages. For example, certain embodiments may advantageously provide a low complexity wireless device-to-wireless device interference measurement. As another example, certain embodiments may advantageously identify aggressor wireless devices with a low-complexity in the wireless device receiver and with lower complexity signaling from the network. As still another example, certain embodiments may advantageously provide aggressor wireless device information to a network to control severe wireless device-to-wireless device interference and enable techniques to improve overall system performance. Other advantages may be readily apparent to one having skill in the art. Certain embodiments may have none, some, or all of the recited advantages.

Figure 3:
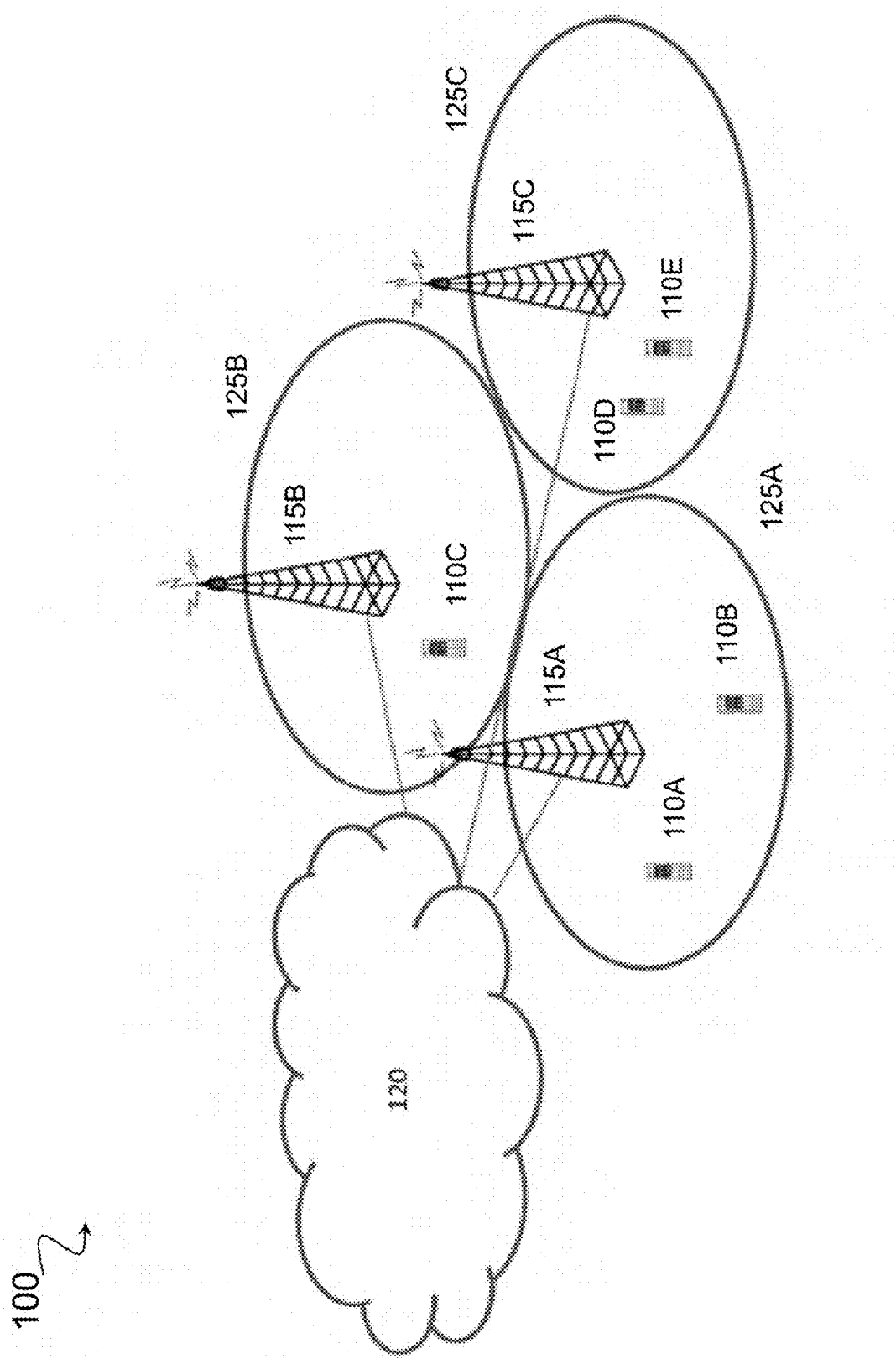
FIG. 3 is a block diagram illustrating an embodiment of a network, in accordance with certain embodiments.

FIG. 3 is a block diagram illustrating an embodiment of a network 100, in accordance with certain embodiments. Network 100 includes one or more wireless devices 110 (e.g., UEs) and one or more network nodes 115 (e.g., gNBs, eNBs, or other suitable network nodes). In the example embodiment of FIG. 3, network 100 includes wireless devices 110A, 110B, 110C, 110D, and 110E, and network nodes 115A, 115B, and 115C. In some embodiments, an area of wireless signal coverage associated with a network node 115 may be referred to as a cell 125. In the example of FIG. 3, cell 125A is an area of wireless signal coverage associated with network node 115A, cell 125B is an area of wireless signal coverage associated with network node 115B, and cell 125C is an area of wireless signal coverage associated with network node 115C.

Wireless devices 110 may communicate with network nodes 115 over a wireless interface. For example, a wireless device 110 may transmit wireless signals to one or more of network nodes 115, and/or receive wireless signals from one or more of network nodes 115. The wireless signals may contain voice traffic data traffic, control signals, and/or any other suitable information. In some embodiments, wireless devices 110 may have device-to-device (D2D) capability. Thus, wireless devices 110 may be able to receive signals from and/or transmit signals directly to another wireless device.

In certain embodiments, network nodes 115 may interface with a radio network controller (RNC). The RNC may control network nodes 115 and may provide certain radio resource management functions, mobility management functions, and/or other suitable functions. In certain embodiments, the functions of the RNC may be included in network node 115. The RNC may interface with a core network node. In certain embodiments, the RNC may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum (NAS) layer. In NAS signaling, signals between wireless devices 110 and the core network node may be transparently passed through the radio access network (RAN). In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term wireless device is used. Wireless devices 110 described herein can be any type of wireless device capable of communicating with network nodes 115 or another wireless device over radio signals. A wireless device 110 may, for example, be a UE, a radio communication device, target device, D2D UE, machine-type-communication (MTC) UE or UE capable of machine-to-machine communication (M2M), low-cost and/or low-complexity UE, a sensor equipped with UE, tablet, mobile terminals, smart phone, laptop embedded equipped (LEE), laptop mounted equipment (LME), USB dongles, Customer Premises Equipment (CPE), etc. Wireless devices 110 may operate under either normal coverage or enhanced coverage with respect to its serving cell. The enhanced coverage may be interchangeably referred to as extended coverage. Wireless devices 110 may also operate in a plurality of coverage levels (e.g., normal coverage, enhanced coverage level 1, enhanced coverage level 2, enhanced coverage level 3 and so on). In some cases, wireless devices 110 may also operate in out-of-coverage scenarios.

Also, n some embodiments the non-limiting term "network node" is used. It can be any kind of network node, which may comprise a base station (BS), radio BS, Node B, multi-standard radio (MSR) radio node such as MSR BS, evolved Node B (eNB), gNB, network controller, RNC, base station controller (BSC), relay node, relay donor node controlling relay, base transceiver station (BTS), AR radio AR transmission points, transmission nodes, Remote Radio Unit (RRU), Remote Radio Head (RRH), nodes in distributed antenna system (DAS), Multi-cell/multicast Coordination Entity (MCE), core network node (e.g., Mobile Switching Center (MSC), Mobility Management Entity (MME), etc.), Operations & Management (O&M), Operations Support System (OSS), Self-Organizing Network (SON), positioning node (e.g., Evolved Serving Mobile Location Center (E-SMLC)), Minimization of Drive Test (MDT), or any other suitable network node.

The terminology such as network node and wireless device should be considered non-limiting and does not imply a certain hierarchical relation between the two; in general "network node" could be considered as device 1 and "UE" device 2, and these two devices communicate with each other over some radio channel.

Example embodiments of wireless devices 110, network nodes 115, and other network nodes (such as RNC or core network node) are described in more detail below with respect to FIGS. 6-10.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices 110 or between a wireless device 110 and another communication device (such as a landline telephone). Furthermore, although certain embodiments may be described as implemented in an NR system, the embodiments described herein may be implemented in any appropriate type of telecommunication system supporting any suitable communication standards (including 5G standards) and using any suitable components, and are applicable to any radio access technology (RAT) or multi-RAT systems in which a wireless device receives and/or transmits signals (e.g., data). For example, the various embodiments described herein may be applicable to NR, Narrowband Internet of Things (NB-IoT), LTE, LTE-Advanced, 5G, UMTS, HSPA, GSM, cdma2000, WCDMA, WiMax, UMB, WiFi, another suitable RAT, or any suitable combination of one or more RATs. Although certain embodiments may be described in the context of wireless transmissions in the DL, the present disclosure contemplates that the various embodiments are equally applicable in the UL.

As described above, with existing approaches the performance benefits of dynamic TDD become smaller as the traffic load increases due to cross-link interference. The present disclosure contemplates various embodiments that provide an improved approach for cross-link interference management without inter-cell signaling. More particularly, in certain embodiments methods of measurement for wireless device-to-wireless device (e.g., UE-to-UE) interference management are proposed. As explained in more detail below, a network node 115, such as network node 115A (e.g., a gNB), can configure a wireless device 110, such as wireless device 110B, to perform one or more measurements (e.g., one or more RSSI measurements) on one or more specific sets of time and frequency resources indicated by network node 115A and report the results of those measurement values to network node 115A. Additionally, network node 115A anther other network nodes 115 in network 100 (such as network nodes 115B and/or 115C) configure other wireless devices 110, such as one or more of wireless devices 110A, 110C, 110D, and 110E, to perform transmissions on one or more of the specific sets of time and frequency resources so that each measurement value reported to network node 115A by wireless device 110B is substantially indicative of the received signal strength (and cross-link interference) from one or more of the other wireless devices 110A, 110C, 110D, and 110E.

In certain embodiments, the described methods include a new measurement approach based on received energy and does not require knowledge of specific sequences, which can be used to differentiate the interference from different wireless devices 110 (e.g.,) UEs). In certain embodiments, an RSSI metric can be used for estimating cross-link interference (e.g., wireless device-to-Wireless device interference). As described in more detail below, in certain, embodiments SRS configurations may be used to allow wireless device 110B to measure different wireless devices 110A, 110C, 110D, and 110E in different sets of time and frequency resources. Efficient signaling and methods to differentiate RSSI from different interfering UEs by using orthogonal sub-band or comb number allocation information are described, as are different measurement and reporting configurations.

Although certain embodiments may be described in which wireless device 110B performs measurements indicative of cross-link interference resulting from transmissions by other wireless devices (e.g., one or more of wireless devices 110A, 110C, 110D, and 110E), the present disclosure is not limited to this example embodiment.

In certain embodiments, a network node 115 (e.g., network node 115A) configures a first wireless device 110 (e.g., wireless device 110B) to perform one or more measurements on certain sets of time and frequency resources. The time and frequency resources may be intended either for data transmission or for control signaling including reference signals. Additionally, one or more of network nodes 115A, 115B, and 115C configure different wireless devices in network 100 (e.g., one or more of wireless devices 110A, 110C, 110D, and 110E) to transmit signals on the certain sets of time and frequency resources. Network node 115A configures wireless device 110B to report the results of the one or more measurements to network node 115A to enable network node 115A to determine the amount of cross-link interference at wireless device 110B due to transmissions by the different wireless devices 110 in network 100.

Network node 115A may configure wireless device 110B to perform one or more measurements on one or more sets of time and frequency resources in any suitable manner. As one example, network node 115A may signal to wireless device 110B an indication of the one or more sets of time and frequency resources to be measured by wireless device 110B. In certain embodiments, network node 115A may use low-complexity signaling with minimal overhead to configure the time and frequency resource sets over which wireless device 110B will perform measurements. For example, network node 115A may configure wireless device 110B to perform measurements on the one or more sets of time and frequency resources by signaling an indication that includes one or more of: a sub-band index; a comb number corresponding to a set of time and frequency resources in these sub-bands; a set of OFDM symbols within each slot; and a set of slots.

Using low-complexity signaling (such as signaling using the above-described indication) may advantageously improve upon prior approaches that relied on real-time signaling between network nodes, which required significant overhead and complexity in equipment. In contrast to prior approaches, the above-described approach to signaling enables cross-link interference management to be achieved in a very efficient way, especially if the resources for measurement are allocated so that they have regular spacing.

Figure 2:
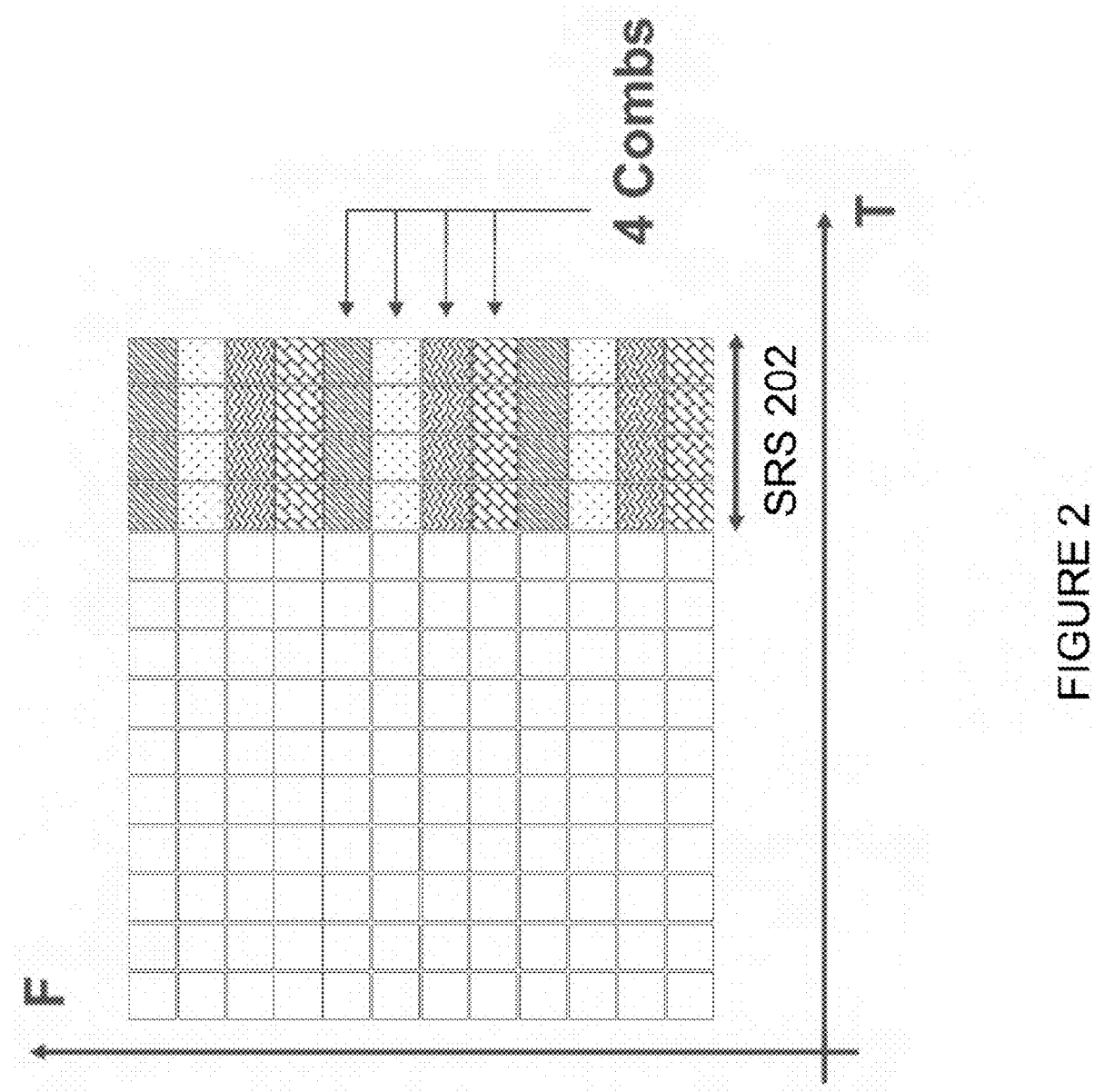
FIG. 2 illustrates an example of FDM multiplexing of multiple SRS transmissions from different UEs.

In certain embodiments, the signaling is made to be even more efficient by configuring wireless device 110B to measure tune and frequency resource sets that span the entire bandwidth of the carrier and all the symbols in the region in which measurements must be made. In such an embodiment, network node 115A may signal the comb spacing, the number of sub-bands, the number of OFDM symbols and number of slots for a single time-frequency measurement set. In certain embodiments, wireless device 110B can derive the one or more sets of time and frequency resources to be measured by wireless device 110B based on the obtained indication (e.g., the information on comb spacing, the number of sub-bands, the number of OFDM symbols and the number of slots). For instance, referring back to the example of FIG. 2 described above, if it is assumed that the measurement is over a single slot across the whole carrier, it is enough to indicate to wireless device 110B that a single time and frequency resource set spans 4 OFDM symbols over all sub-bands and that the comb spacing is 4. Wireless device 110B can then determine the 4 time and frequency resource sets over which to measure based on this information.

In certain embodiments, network node 115A may configure wireless device 110B to perform measurements in one or more sets of time and frequency resources carrying SRS transmissions from other wireless devices 110 (e.g., one or more of wireless devices 110A, 110C, 110D, and 110E). As one example, network node 115A may configure wireless device 110B to perform measurements in one or more Sets of time and frequency resources carrying SRS transmissions from wireless device 110A in cell 125A served by network node 115A.

As another example, network node 115A may configure wireless device 110B to perform measurements in one or more sets of time and frequency resources carrying SRS transmissions from wireless device 110C in cell 125B served by network node 115C and/or SRS transmissions from one or more of wireless devices 110D and 110E, operating in cell 125C served by network node 115C. In such a scenario, neighboring network nodes 115B and 115C may configure SRS transmissions from wireless devices 110 operating in cells 125B and 125C served by network nodes 115B and 115C, respectively. For example, network node 115B may configure SRS transmissions from wireless device 110C and network node 115C may configure SRS transmissions from one or more of wireless devices 110D and 110E.

Neighboring network nodes 115B and 115C may signal the sets of time and frequency resources (e.g., time-frequency resource elements) carrying SRS transmissions by one or more of wireless devices 110C, 110D, and 110E to network node 115A. For example, network node 115B may signal SRS configuration information for wireless device 110C to network node 115A, and network node 115C may signal SRS configuration information for one or more of wireless devices 110D and 110E to network node 115A. In certain embodiments, network node 115A may receive the SRS configuration information from network nodes 115B and 115C via an unspecified signaling means or using a standardized interface such as the Xn interface. In such a scenario, network node 115A can configure wireless device 110B to perform measurements based on the obtained SRS configuration information in order to determine an amount of cross-link interference resulting from SRS transmissions by one or more of wireless devices 110C, 110D, and 110E, as described in more detail below.

Similarly, network nodes 115A, 115B, and 115C can configure the other wireless devices 110, such as one or more of wireless devices 110A, 110C, 110D, and 110E, to transmit a signal on the one or more sets of time and frequency resources in any suitable manner. For example, one or more of network nodes 115A, 115B, and 115C may configure wireless devices operating in their respective cells 125A, 125B, and 125C to perform SRS transmissions. As another example, one or more of network nodes 115A, 115B, and 115C may signal to some or all of wireless devices 110A, 110C, 110D, and 110E an indication of the one or more sets of time and frequency resources on which to transmit one or more signals (that will be measured by wireless device 110B). In an analogous manner to that described above for configuring wireless device 110E to perform measurements on one or more sets of time and frequency resources, network nodes 115A, 115B, and 115C may use low-complexity signaling with minimal overhead to configure the time and frequency resource sets over which some or all of wireless devices 110A, 110C, 110D, and 110E will transmit a signal. For example, network node 115A may configure wireless device 110A to transmit a signal on the one or more sets of time and frequency resources by signaling an indication that includes one or more of: a sub-band index a comb number corresponding to a set of time and frequency resources in these sub-bands; a set of OFDM symbols within each slot; and a set of slots. For analogous reasons to those described above, the use of low-complexity signaling as described above may advantageously improve upon prior approaches that relied on signaling that required significant overhead and complexity in equipment.

In certain embodiments, all of the other wireless devices 110A, 110C, 110D, and 110E may be configured to transmit a signal on the same set or sets of resources. Alternatively, the other wireless devices 110A, 110C, 110D, and 110E may be configured to transmit on different sets of resources. As another alternative, a subset of the other wireless devices (e.g., wireless devices 110A and 110C) may be configured to transmit a signal on the same sets of resources, while each of wireless devices 110D and 110E may be configured to transmit on different sets of time and frequency resources. Other configurations are possible.

This flexibility in configuring transmissions by the other wireless devices 110 is advantageous, as it enables network node 115A to determine the amount of cross-link interference to wireless device 110B in a variety of scenarios. As described in more detail below, by configuring the other wireless devices (e.g., one or more of wireless deuces 110A, 110C, 110D, and 110E) to transmit a signal on certain sets time and frequency resources, and configuring wireless device 110B to perform measurements on some or all of the same configured resources, network node 115A is able to determine an amount of cross-link interference to wireless device 110B resulting from transmissions by one or more of the other wireless devices.

After being configured as described above, the one or more different wireless devices one or more of wireless devices 110A, 1100, 110D, and 110E) will transmit one or more signals (e.g., SRS) on the indicated sets of time and frequency resources, and wireless device 110B will perform one or more measurements (e.g., one or more RSSI measurements) on each of the one or more sets of time and frequency resources and report a result of the one or more measurements to network node 115A.

In certain embodiments, the measurements performed by wireless device 110B may be RSSI measurements. In certain embodiments, wireless device 110B may perform the one or more measurements based on received energy. For example, in certain embodiments, the one or more measurements can be an average of the total received power observed in the configured set of time and frequency resource elements. In some cases, the measurements may include signals from co-channel serving and non-serving cells, adjacent channel interference, thermal noise etc.

In certain embodiments, wireless device 110B may perform the one or more measurements without knowledge of any sequences associated with the one or more sets of time and frequency resources. In other words, wireless device 110B does not need to know any specifies regarding the signals that are transmitted in these time and frequency resources.

Wireless device 110B may perform the one or more measurements on the indicated one or more sets of time and frequency resources and report the results of the measurement to network node 115A in a variety of ways. For example, wireless device 110B may be configured to perform measurements according to one or more of the following options.

As a first example, wireless device 110B may perform a single shot measurement over a time-frequency resource set in one slot and send a report of this single shot measurement to network node 115A.

As a second example, wireless device 110B may perform a set of measurements over a set of slots, each carrying one time-frequency resource set over which a single RSSI measurement is made by wireless device 110B and send a report of the set of measurements with one reported RSSI value per slot to network node 115A. In certain embodiments, the report may occur periodically after each slot in which a measurement is made. In certain embodiments, the report may occur aperiodically with a set of measurements corresponding to the specific slots where the measurements were made.

As a third example, wireless device 110B may perform a measurement over a time-frequency resource set that spans slots which may occur periodically or aperiodically and send a report of a single averaged measurement over multiple slots to network node 115A.

As a fourth example, wireless device 110B may perform a measurement over a time-frequency resource set that occurs in a pre-configured set of slots and send to network node 115A a report of the measured values in any given slot if the measurement satisfies one or more reporting triggers. The reporting triggers may be configured in a variety of ways. As a first example, reporting may be triggered if the measured value exceeds a certain threshold. As a second example, reporting may be triggered based on a ratio of a value measured in a single time-frequency resources set to the average of the values measured across multiple time-frequency resource sets. As a third example, reporting may be triggered based on an estimated value of a parameter that is related to the burstiness or any of the above measures (e.g., the variance or the number of measurements that exceed the average by more than a certain amount, exceeds a threshold). Examples include whether the difference between the maximum and minimum measurements of any of the above-mentioned values during a certain period of time is larger than a certain threshold, and whether the difference between the maximum and average of measurements of any of the above values during a certain period of time is larger than a certain threshold.

It will be clear to those skilled in the art that other possible combinations of measurements and reporting are extensions of the above options.

In certain embodiments, wireless device 110B may be configured with a certain measurement and reporting configuration as described above, and network node 115A can determine the cross-link interference to wireless device 110B resulting from transmissions by one or more of the different wireless devices (e.g., wireless devices 110A, 110C, 110D, and 110E) in the same time and frequency resources. As one example, wireless device 110B may be configured with the second example option described above (where wireless device 110B performs a set of measurements over a set of slots, each carrying one time-frequency resource set over which a single RSSI measurement is made by wireless device 110B per slot). A report of the set of measurements is made with one reported RSSI value per slot. In this case, network node 115A could receive a report of a single RSSI value per slot over which wireless device 110B makes measurements, but network node 115A (alone or in cooperation with neighboring network nodes 115B and 115C) could configure different wireless devices 110 (e.g., wireless devices 110A, 110C, 110D, 110E) to transmit in different slots. Thus, wireless device 110B could continue making its measurements without any reconfiguration while network node 115A is able to gather estimates of the cross-link interference to different UEs.

As another example, recall that network node 115A may configure wireless device 110B to perform measurements on one or more sets of time and frequency resources based on SRS configuration information for other wireless devices 110 (e.g., one or more of wireless devices 110C, 110D, and 110E) received from one or more of neighboring network nodes 115B and 115C. The measurement values reported by wireless device 110B may be used to estimate the amount of cross-link interference at wireless device 110B due to the transmissions by the one or more different wireless devices 110. For instance, network node 115C may assign a single wireless device 110 in cell 115C, such as wireless device 110D, to a single time-frequency resource set (on which a single RSSI measurement can be generated). When a single UE is assigned, the measurement reported by wireless device 110B is indicative of the cross-link interference observed from a single wireless device 110 (e.g., wireless device 110D) barring other impairments such as interference from cells that are further away that may reuse these elements, thermal noise, etc.

In some cases, however, network node 115C may assign multiple wireless devices 110, such as wireless devices 110D and 110E, to transmit on a single set. When multiple wireless devices 110 are assigned to the same time-frequency resource set, then the measurement reported by wireless device 110D reflects the combined interference from these multiple wireless devices 110 (e.g., wireless devices 110D and 110E). In another variation, the network may configure SRS transmissions from multiple wireless devices 110 in a single time-frequency resource set, but with each wireless device being sewed by a different neighboring network node.

The various embodiments described above may advantageously enable network node 115A to identify, from among the other wireless devices 110A, 110C, 110D, and 110E, which wireless devices 110 are aggressor wireless devices toward wireless device 110B and facilitate controlling severe wireless device-to-wireless device interference in network 100 and enable techniques to improve overall system performance. For example, in certain embodiments network node 115A may schedule the one or more different wireless devices 110 such that the amount of cross-link interference at wireless device 110B is reduced.

Figure 4:
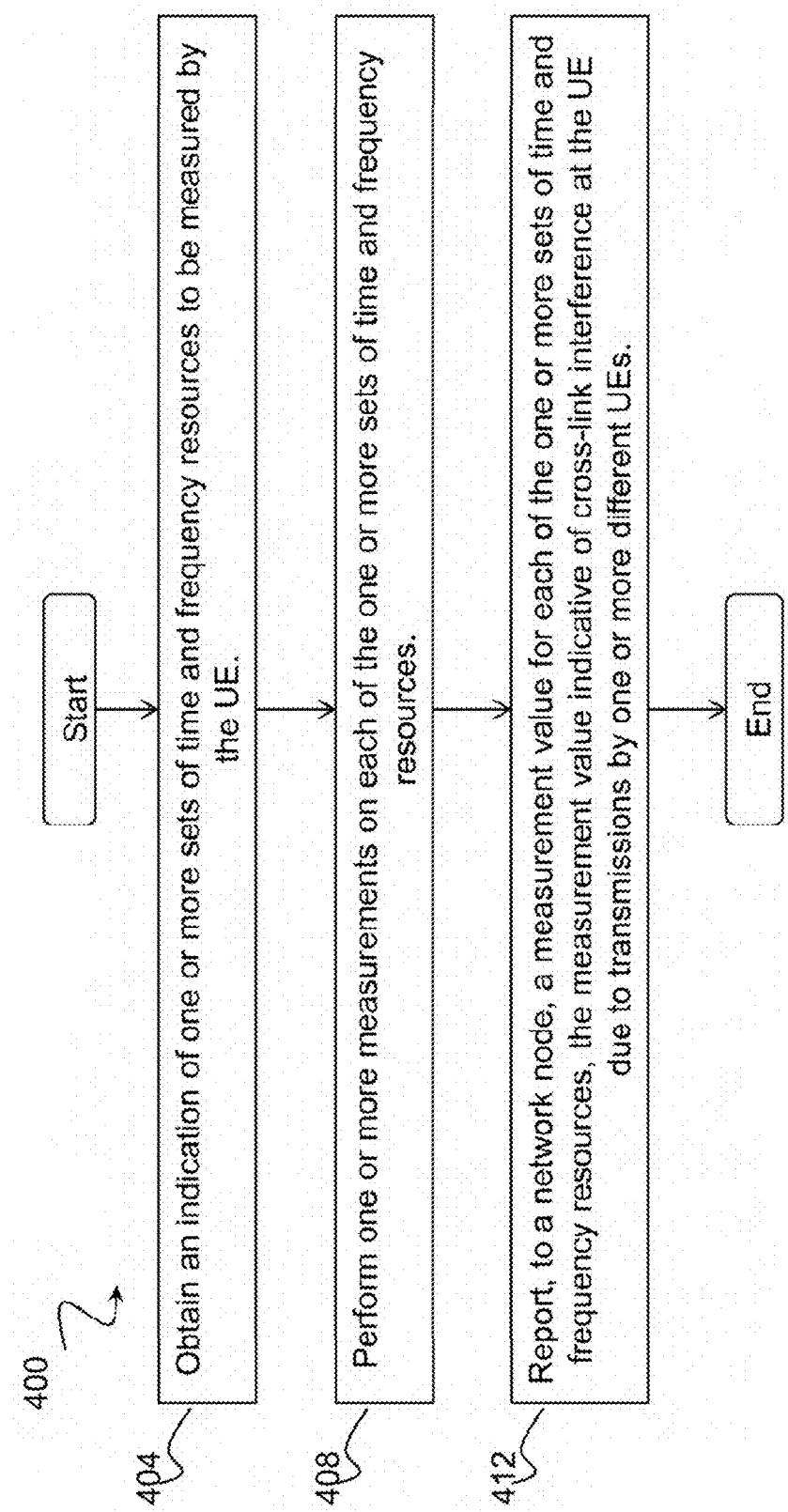
FIG. 4 is a flow diagram of a method in a UE, in accordance with certain embodiments.

FIG. 4 is a flow diagram of a method 400 in a UE, in accordance with certain embodiments. Method 400 begins at step 404, where the UE obtains an indication of one or more sets of time and frequency resources to be measured by the UE. In certain embodiments, the obtained indication of one or more sets of time and frequency resources to be measured by the LE may comprise one or more of: a sub-band index; a comb number corresponding to a set of time and frequency resources in a sub-band; a set of OFDM symbols in a slot; and a set of slots.

In certain embodiments, the method may comprise deriving the one or more sets of time and frequency resources to be measured by the UE based on the obtained indication. In certain embodiments, the method may comprise obtaining a configuration for a Sounding Reference Signal (SRS) transmission by the UE, and transmitting the SRS according to the obtained configuration.

At step 408, the UE performs one or more measurements on each of the one or more sets of time and frequency resources. In certain embodiments, the one or more measurements may be performed based on received energy. In certain embodiments, the one or more measurements may be performed without knowledge of any sequences associated with the one or more sets of time and frequency resources.

In certain embodiments, performing one or more measurements on each of the one or more sets of time and frequency resources may comprise performing an RSSI measurement on each of the one or more sets of time and frequency resources. In certain embodiments, the RSSI measurement may comprise an average of total received power observed in a set of time and frequency resources. In certain embodiments, the RSSI measurement may comprise a single-shot measurement performed over a set of time and frequency resources in one slot, and the reported measurement value may be a value of the single-shot measurement. In certain embodiments, the RSSI measurement may comprise a set of measurements performed over a set of slots, each slot carrying one of the one or more time and frequency resource sets, and the reported measurement value may comprise a set of measurements with one reported RSSI value per slot. In certain embodiments, the RSSI measurement may comprise a measurement performed over a set of time and frequency resources that spans multiple slots, and the reported measurement value may comprise an averaged measurement over the multiple slots. In certain embodiments, the RSSI measurement may comprise a measurement performed over a set of time and frequency resources that occurs in a pre-configured set of slots, and the reported measurement value may comprise a measured value for a slot in the pre-configured set of slots if the measured value satisfies a reporting trigger.

At step 412, the UE reports, to a network node, a measurement value for each of the one or more sets of time and frequency resources, the measurement value indicative of cross-link interference at the UE due to transmissions by one or more different UEs.

Figure 5:
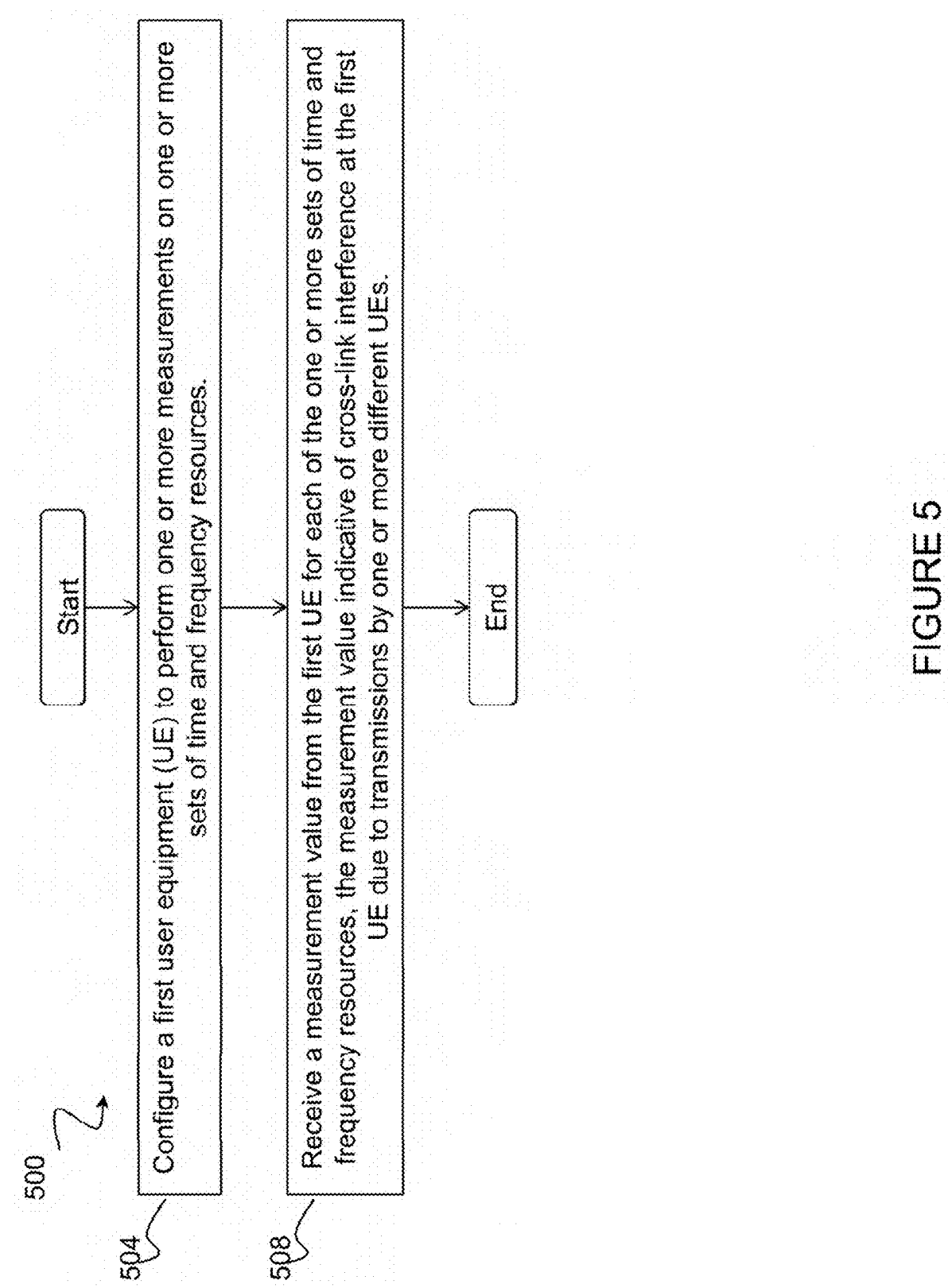
FIG. 5 is a flow diagram of a method in a network node, in accordance with certain embodiments.

FIG. 5 is a flow diagram of a method 500 in a network node, in accordance with certain embodiments. Method 500 begins at step 504, where the network node configures a first UE to perform one or more measurements on one or more sets of time and frequency resources. In certain embodiments, configuring the first UE to perform one or more measurements on the one or more sets of time and frequency resources may comprise signaling an indication of the one or more sets of time and frequency resources to be measured by the first UE. In certain embodiments, the indication may comprise one or more of: a sub-band index; a comb number corresponding to a set of time and frequency resources in a sub-hand; a set of OFDM symbols in a slot; and a set of slots.

In certain embodiments, configuring the first UE to perform one or more measurements on the one or more sets of time and frequency resources may comprise configuring the first UE to perform the one or more measurements based on received energy. In certain embodiments, configuring the first UE to perform one or more measurements on the one or more sets of time and frequency resources may comprise configuring the first UE to perform the one or more measurements without knowledge of any sequences associated with the one or more sets of time and frequency resources. In certain embodiments, configuring the first UE to perform one or more measurements on the one or more sets of time and frequency resources may comprise configuring the first UE to perform an RSSI measurement on the one or more sets of time and frequency resources. In certain embodiments, the RSSI measurement may comprise an average of total received power observed in a set of time and frequency resources.

In certain embodiments, configuring the first UE to perform one or more measurements on the one or more sets of time and frequency resources may comprise configuring the first UE to perform a set of measurements over a set of slots, each slot carrying one of the one or more time and frequency resource sets. The received measurement value may comprise a set of measurements with one reported RSSI value per slot.

In certain embodiments, configuring the first UE to perform one or more measurements on the one or more sets of time and frequency resources may comprise configuring the first UE to perform a measurement over a set of time and frequency resources that spans multiple slots. The received measurement value may comprise an averaged measurement over the multiple slots In certain embodiments, the method may comprise configuring the one or more different UEs to transmit a signal on the one or more sets of time and frequency resources. In certain embodiments, the one or more different UEs are configured to transmit an SRS.

In certain embodiments, the method may comprise receiving, from a neighboring network node, an SRS transmission configuration for the one or more different UEs, the SRS transmission configuration indicating that the one or more different lifts are configured to perform SRS transmissions on the one or more sets of time and frequency resources. The first UE may be configured to perform one or more measurements on the one or more sets of time and frequency resources according to the received SRS transmission configuration.

At step 508, the network node receives a measurement value from the first UE for each of the one or more sets of time and frequency resources, the measurement value indicative of cross-link interference at the first UE due to transmissions by one or more different UEs.

In certain embodiments, the method may comprise estimating, based on the received measurement value, an amount of cross-link interference at the first UE due to transmissions by the one or more different UEs. In certain embodiments, the method may comprise scheduling the one or more different UEs such that the amount of cross-link interference at the first UE is reduced.

Figure 6:
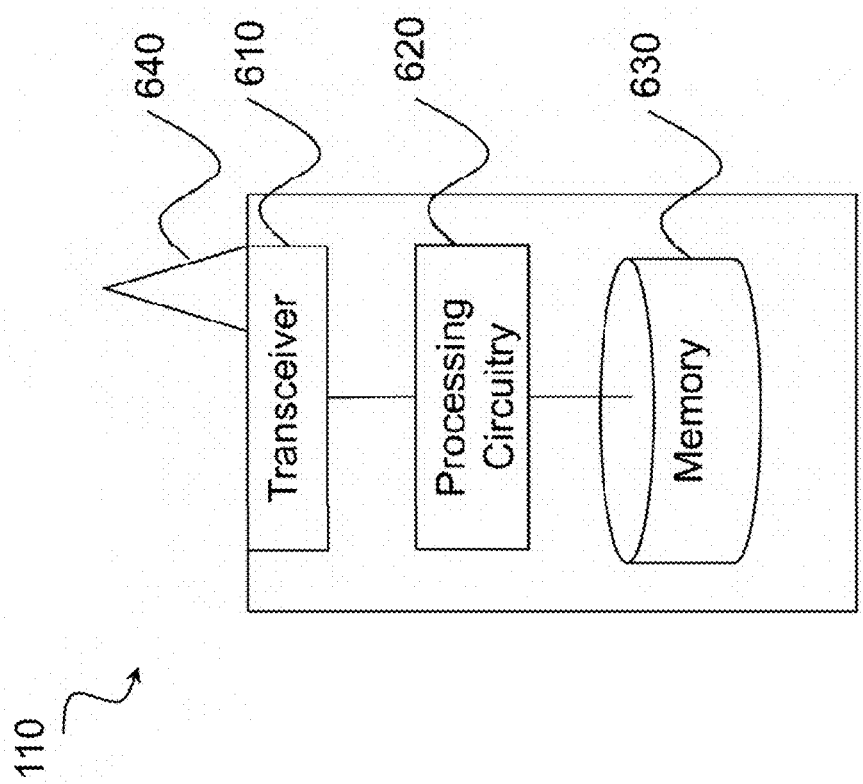
FIG. 6 is a block schematic of an exemplary wireless device, in accordance with certain embodiments.

FIG. 6 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, an MTC device/M2M device, LEE, LME, USB dongles, a D2D capable device, or another device that can provide wireless communication. A wireless device 110 may also be referred to as UE, a station (STA), a device, or a terminal in some embodiments. Wireless device 110 includes transceiver 610, processing circuitry 620, and memory 630. In some embodiments, transceiver 610 facilitates transmitting wireless signals to and receiving wireless signals from network node 115 (e.g., via antenna 640), processing circuitry 620 executes instructions to provide some or all of the functionality described above as being provided by wireless device 110, and memory 630 stores the instructions executed by processing circuitry 620.

Processing circuitry 620 may include any suitable combination of hardware and software implemented in one or more modules to execute instructions and manipulate data to perform some or all of the described functions of wireless device 110, such as the functions of wireless device 110 described above in relation to FIGS. 1-5. In some embodiments, processing circuitry 620 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 620.

Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 620. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
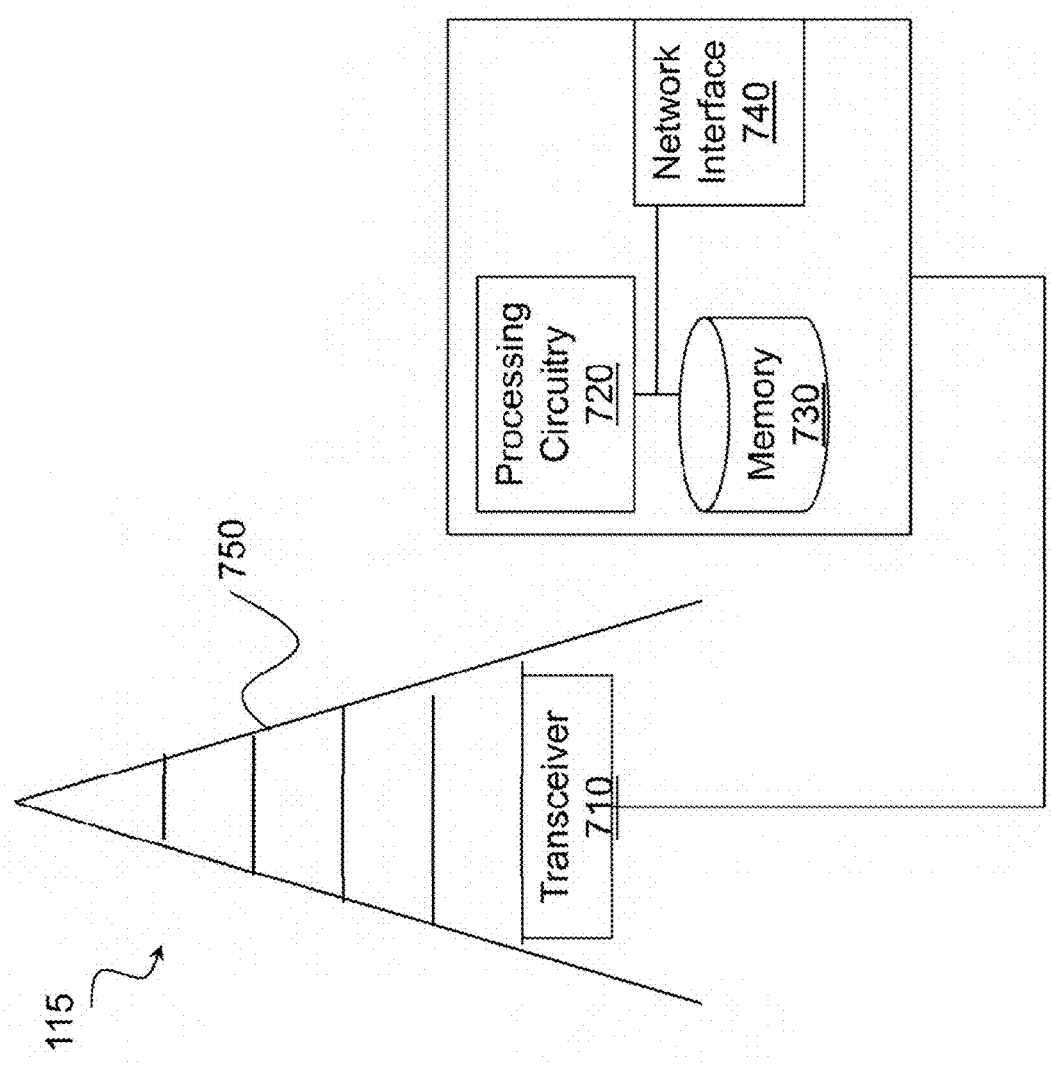
FIG. 7 is a block schematic of an exemplary network node, in accordance with certain embodiments.

FIG. 7 is a block schematic of an exemplary network node 115, in accordance with certain embodiments. Network node 115 may be any type of radio network node or any network node that communicates with a UE and/or with another network node. Examples of network node 115 include an eNB, a gNB, a node B, a BS, a wireless AP (e.g., a Wi-Fi AP), a low power node, a BTS, relay, donor node controlling relay, transmission points, transmission nodes, RRU, RRH, MSR radio node such as MSR BS, nodes in DAS, O&M, OSS, SON, positioning node (e.g., E-SMLC), MDT, or any other suitable network node. Network nodes 115 may be deployed throughout a network as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processing circuitry 720, memory 730, and network interface 740. In some embodiments, transceiver 710 facilitates transmitting wireless signals to and receiving wireless signals from a wireless device, such as wireless device 110 described above, (e.g., via antenna 750), processing circuitry 720 executes instructions to provide some or all of the functionality described above as being provided by a network node 115, memory 730 stores the instructions executed by processing circuitry 720, and network interface 740 communicates signals to backend network components, such as a gateway, switch, router, Internet, Public Switched Telephone Network (PSTN), core network nodes or radio network controllers 130, etc.

Processing circuitry 720 may include any suitable combination of hardware and software implemented in one or more modules to execute instructions and manipulate data to perform some or all of the described functions of network node 115, such as those described above in relation to FIGS. 1-5. In some embodiments, processing circuitry 720 may include, for example, one or more computers, one or more CPUs, one or more microprocessors, one or more applications, one or more ASICs, one or more FPGAs and/or other logic.

Memory 730 is generally operable to store instructions, such as a computer program, software, an application including one or more of logic, rules, algorithms, code, tables, etc. and/or other instructions capable of being executed by processing circuitry 720. Examples of memory 730 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
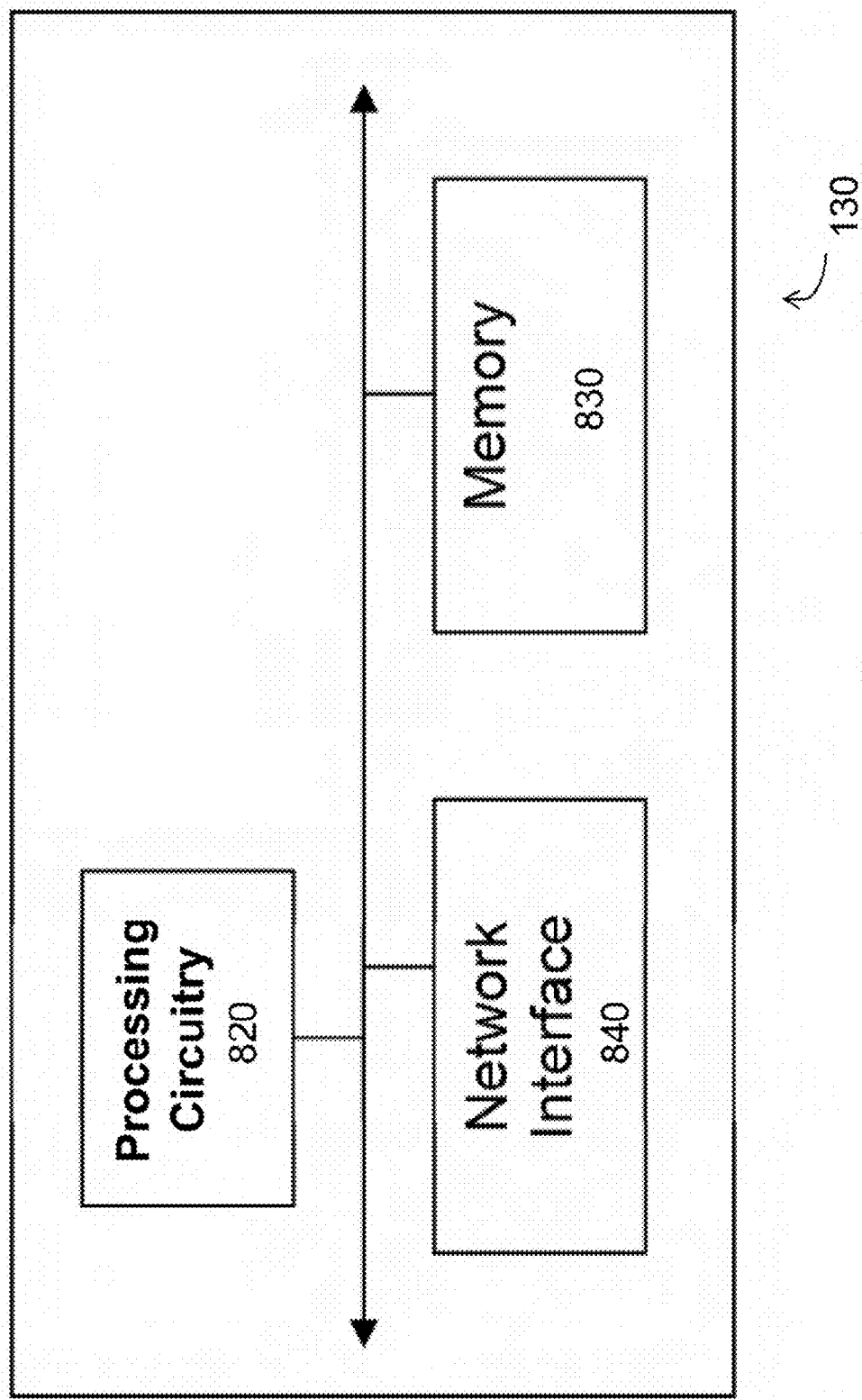
FIG. 8 is a block schematic of an exemplary radio network controller or core network node, in accordance with certain embodiments.

FIG. 8 is a block schematic of an exemplary RNC or core network node 130, in accordance with certain embodiments. Examples of network nodes can include a MSC, a serving GPRS support node (SGSN), an MME, an RNC, a BSC, and so on. The RNC or core network node 130 includes processing circuitry 820, memory 830, and network interface 840. In some embodiments, processing circuitry 820 executes instructions to provide some or all of the functionality described above as being provided by the network node, memory 830 stores the instructions executed by processing circuitry 820, and network interface 840 communicates signals to any suitable node, such as a gateway, switch, router, Internet, Public Switched Telephone Network (PSTN), network nodes 115, radio network controllers or core network nodes 130, etc.

Processing circuitry 820 may include any suitable combination of hardware and software implemented in one or more modules to execute instructions and manipulate data to perform some or all of the described functions of the radio network controller or core network node 130. In some embodiments, processing circuitry 820 may include, for example, one or more computers, ono or more CPUs, one or MON microprocessors one or more applications, one or more ASICs, one or more FPGAs and/or other logic.

Memory 830 is generally operable to store instructions, such as a computer program, software, an application including one or more of logic, rules, algorithms, code, tables, etc. and/or other instructions capable of being executed by processing circuitry 820. Examples of memory 830 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 840 is communicatively coupled to processing circuitry 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

FIG. 9 is a schematic block diagram of an exemplary wireless device, in accordance with certain embodiments. Wireless device 110 may include one or more modules. For example, wireless device 110 may include a determining module 910, a communication module 920, a receiving module 930 an input module 940, a display module 950, and any other suitable modules. In some embodiments, one or more of determining module 910, communication module 920, receiving module 930, input module 940, display module 950, or any other suitable module may be implemented using one or more processors, such as processing circuitry 620 described above in relation to FIG. 6. In certain embodiments, the functions of two or more of the various modules may be combined into a single module. In certain embodiments, wireless device 110 may have some, none, or all of the modules described above. Wireless device 110 may perform the methods for measurement and reporting for cross-link interference management based on signal strength described above in relation to FIGS. 1-5.

Determining module 910 may perform the processing functions of wireless device 110. For example, determining module 910 may obtain an indication of one or more sets of time and frequency resources to be measured by wireless device 110. In certain embodiments, determining module 910 may obtain one or more of a sub-band index; a comb number corresponding to a set of time and frequency resources in a sub-band; a set of OFDM symbols in a slot; and a set of slots.

As another example, determining module 910 may derive the one or more sets of time and frequency resources to be measured by wireless device 110 based on the obtained indication.

As still another example, determining module 910 may obtain a measurement configuration for an RSSI measurement. As yet example, determining module 910 may obtain a reporting configuration for reporting the RSSI measurement. As another example, determining module 910 may obtain a configuration for an SRS transmission by wireless device 110.

As another example, determining module 910 may perform one or more measurements on each of the one or more sets of time and frequency resources. Determining module 910 may perform the one or more measurements based on received energy. Determining module 910 may perform the ore or more measurements without knowledge of any sequences associated with the one or more sets of time and frequency resources. Determining module 910 may perform an RSSI measurement on each of the one or more sets of time and frequency resources. In certain embodiments, determining module 910 may perform an RSSI measurement comprising an average of total received power observed in a set of time and frequency resources. In certain embodiments, determining module 910 may perform an RSSI measurement comprising a single-shot measurement performed over a set of time and frequency resources in one slot. In certain embodiments, determining module 910 may perform an RSSI measurement comprising a set of measurements performed over a set of slots, each slot carrying one of the one or more time and frequency resource sets. In certain embodiments, determining module 910 may perform an RSSI measurement comprising a measurement performed over a set of time and frequency resources that spans multiple slots. In certain embodiments, determining module 910 may perform an RSSI measurement comprising a measurement performed over a set of time and frequency resources that occurs in a pre-configured set of slots. In certain embodiments, determining module 910 may determine whether the performed RSSI measurement value satisfies a reporting trigger.

Determining module 910 may include or be included in one or more processors, such as processing circuitry 620 described above in relation to FIG. 6. Determining module 910 may include analog and/or digital circuitry configured to perform any of the functions of determining module 910 and/or processing circuitry 620 described above. The functions of determining module 910 described above may, in certain embodiments, be performed in one or more distinct modules.

Communication module 920 may perform the transmission functions of wireless device 110. For example, communication module 920 may report, to a network node (e.g., a network node 115 described herein), a measurement value for each of the one or more sets of time and frequency resources, the measurement value indicative of cross-link interference at wireless device 110 due to transmissions by one or more different wireless devices. In certain embodiments, communication module 920 may report a value of a single-shot measurement. In certain embodiments, communication module 920 may report a set of measurements with one reported RSSI value per slot. In certain embodiments, communication module 920 may report an averaged measurement over multiple slots. In certain embodiments, communication module 920 may report a measured value for a slot in a pre-configured set of slots if the measured value satisfies a reporting trigger.

As another example, communication module 920 may transmit an SRS according to an obtained configuration for a SRS transmission by wireless device 110.

Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 110. For example, receiving module 930 may obtain an indication of one or more sets of time and frequency resources to be measured by wireless device 110. In certain embodiments, receiving module 930 may receive signaling indicating the one or more sets of time and frequency resources on which to perform the RSSI measurement. In certain embodiments, receiving module 930 may obtain one or more of a sub-band index: a comb number corresponding to a set of time and frequency resources in a sub-band; a set of OFDM symbols in a slot; and a set of slots.

As another example, receiving module 930 may obtain a configuration for an SRS transmission by wireless device 110.

As still another example, receiving module 930 may obtain a measurement configuration for an RSSI measurement. As yet another example, receiving module 930 may obtain a reporting configuration for the RSSI measurement.

Receiving module 930 may include a receiver and/or a transceiver. Receiving module 930 may include a receiver and/or a transceiver, such as transceiver 610 described above m relation to FIG. 6. Receiving module 930 may include circuitry configured to wirelessly receive messages and/or signals. In particular embodiments, receiving module 930 may communicate received messages and/or signals to determining module 910. The functions of receiving module 930 described above may, in certain embodiments, be performed in one or more distinct modules.

Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910. The functions of input module 940 described above may, in certain embodiments, be performed in one or more distinct modules.

Display module 950 may present signals on a display of wireless device 110. Display module 950 may include the display and/or any appropriate circuitry and hardware configured to present signals on the display. Display module 950 may receive signals to present on the display from determining module 910. The functions of display module 950 described above may, in certain embodiments, be performed in one or more distinct modules.

Determining module 910, communication module 920, receiving module 930, input module 940, and display module 950 may include any suitable configuration of hardware and/or software. Wireless device 110 may include additional modules beyond those shown in FIG. 9 that may be responsible for providing any suitable functionality, including any of the functionality described above and/or any additional functionality (including any functionality necessary to support the various solutions described herein).

FIG. 10 is a schematic block diagram of an exemplary network node 115, in accordance with certain embodiments. Network node 115 may include one or more modules. For example, network node 115 may include determining module 1010, communication module 1020, receiving module 1030, and any other suitable modules. In some embodiments, one or more of determining module 1010, communication module 1020, receiving module 1030, or any other suitable module may be implemented using one or more processors, such as processing circuitry 720 described above in relation to FIG. 7. In certain embodiments, the functions of two or more of the various modules may be combined into a single module. In certain embodiments, wireless device 110 may have some, none, or all of the modules described above. Network node 115 may perform the methods for measurement and reporting for cross-link interference management based on signal strength described above with respect to FIGS. 1-5.

Determining module 1010 may perform the processing functions of network node 115. For example, determining module 1010 may configure a first wireless device (e.g., a wireless device 110 described herein) to perform one or more measurements on one or more sets of time and frequency resources. In certain embodiments, determining module 1010 may configure the first wireless by signaling an indication of the one or more sets of time and frequency resources to be measured by the first wireless device. In certain embodiments, determining module 1010 may signal an indication comprising one or more of: a sub-band index; a comb number corresponding to a set of time and frequency resources in a sub-band; a set of OFDM symbols in a slot; and a set of slots.

In certain embodiments, determining module 1010 may configure the first wireless device to perform the one or more measurements based on received energy. In certain embodiments, determining module 1010 may configure the first wireless device to perform the one or more measurements without knowledge of any sequences associated with the one or more sets of time and frequency resources. In certain embodiments, determining module 1010 may configure the first wireless device to perform an RSSI measurement (e.g., average of total received power observed in a set of time and frequency resources) on the one or more sets of time and frequency resources. In certain embodiments, determining module 1010 may configure the first wireless device to perform a set of measurements over a set of slots, each slot carrying one of the one or more time and frequency resource sets. In certain embodiments, determining module 1010 may configure the first wireless device to perform a measurement over a set of time and frequency resources that spans multiple slots.

As another example, determining module 1010 may configure the one or more different wireless devices to transmit a signal on the one or more sets of time and frequency resources. In certain embodiments, determining module 1010 may configure the one or more different wireless devices to transmit an SRS. In certain embodiments, determining module 1010 may obtain an SRS transmission configuration for the one or more different wireless devices, the SRS transmission configuration indicating that the one or more different wireless devices are configured to perform SRS transmissions on the one or more sets of time and frequency resources. In certain embodiments, determining module 1010 may configure the first wireless device to perform one or more measurements on the one or more sets of time and frequency resources according to the obtained SRS transmission configuration.

As still another example, determining module 1010 may obtain a measurement value from the first wireless device for each of the one or more sets of time and frequency resources, the measurement value indicative of cross-link interference at the first wireless device due to transmissions by one or more different wireless devices.

As yet another example, determining module 1010 may estimate, based on the obtained measurement value, an amount of cross-link interference at the first wireless device due to transmissions by the one or more different wireless devices. As another example, determining module 1010 may schedule the one or more diff rent wireless devices such that the amount of cross-link interference at the first wireless device is reduced.

Determining module 1010 may include or be included in one or more processors, such as processing circuitry 720 described above in relation to FIG. 7. Determining module 1010 may include analog and/or digital circuitry configured to perform any of the functions of determining module 1010 and/or processing circuitry 720 described above. The functions of determining module 1010 may, in certain embodiments, be performed in one or more distinct modules.

Communication module 1020 may perform the transmission functions of network node 115. For example, communication module 1020 may signal an indication of the one or more sets of time and frequency resources to be measured by the first wireless device. In certain embodiments, communication module 1020 may signal an indication comprising one or more of a sub-band index; a comb number corresponding to a set of time and frequency resources in a sub-band; a set of OFDM symbols in a slot; and a set of slots. As another example, communication module 1020 may send a reporting configuration to the first wireless device.

Communication module 1020 may transmit messages to one or more of wireless devices 110. Communication module 1020 may include a transmitter and/or a transceiver, such as transceiver 710 described above in relation to FIG. 7. Communication module 1020 may include circuitry configured to wirelessly transmit messages and or signal. In particular embodiments, communication module 1020 may receive messages and/or signals for transmission from determining module 1010 or any other module. The functions of communication module 1020 may, in certain embodiments, be performed in one or more distinct modules.

Receiving module 1030 may perform the receiving functions of network node 115. For example, receiving module 1030 may receive a measurement value from a first wireless device for each of the one or more sets of time and frequency resources, the measurement value indicative of cross-link interference at the first wireless device due to transmissions by one or more different wireless devices. In certain embodiments, receiving module 1030 may receive a set of measurements with one reported RSSI value per slot. In certain embodiments, receiving module 1030 may receive an averaged measurement over the multiple slots.

As another example, receiving module 1030 may receive, from a neighboring network node, an SRS transmission configuration for the one or more different wireless devices, the SRS transmission configuration indicating that the one or more different wireless devices are configured to perform SRS transmissions on the one or more sets of time and frequency resource.

Receiving module 1030 may receive any suitable information from a wireless device. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010 or any other suitable module. The functions of receiving module 1030 may, in certain embodiments, be performed in one or more distinct modules.

Determining module 1010, communication module 1020, and receiving module 1030 may include any suitable configuration of hardware and/or software. Network node 115 may include additional modules beyond those shown in FIG. 10 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3$^{rd}$ Generation Partnership Project
AP Access Point
ASIC Application Specific Integrated Circuit
BS Base Station
BSC Base Station Controller
BTS Base Transceiver Station
CD Compact Disk
CPE Customer Premises Equipment
CPU Central Processing Unit
CRC Cyclic Redundancy Check
D2D Device-to-device
DAS Distributed Antenna System
DL Downlink
DMRS Demodulation Reference Signal
DVD Digital Video Disk
eNBE evolved Node B
E-SMLC Evolved Serving Mobile Location Center
FDD Frequency Division Duplex
FDM Frequency Division Multiplexing
FPGA Field Programmable Gate Array
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MDT Minimization of Drive Test
MME Mobility Management Entity
MSC Mobile Switching Center
MSR Multi-standard Radio
MTC Machine-Type Communication
NAS Non-Access Stratum
NB-IoT Narrow band Internet of Things
NR New Radio
O&M Operations and Management
OFDM Orthogonal Frequency Division Multiplexing
OSS Operations Support System
PSTN Public Switched Telephone Network
PUSCH Physical Uplink Shared Channel
RAM Random Access Memory
RAN Radio Access Network
RAT Radio Access Technology
RE Resource Element
RNC Radio Network Controller
ROM Read-Only Memory
RRC Radio Resource Control
RRH Remote Radio Head
RRU Remote Radio Unit
RSSI Received Signal Strength Indicator
SON Self-Organizing Network
SRS Sounding Reference Signal
TDD Time Division Duplex
UE User Equipment
UL Uplink
WAN Wide Area Network
WLAN Wireless Local Area Network

The invention claimed is:

1. A method in a user equipment (UE), comprising:
obtaining, from a network node, an indication of one or more sets of time and frequency resources to be measured by the UE, wherein:
the one or more sets of time and frequency resources comprises time and frequency resources with regular spacings and are time and frequency resources in which one or more different UEs, in one or more cells different from the UE's cell, are configured to transmit a signal;
the indication comprises one or more of a sub-band index and a comb number corresponding to the one or more sets of times and frequency resources; and
performing one or more measurements on each of the one or more sets of time and frequency resources;
reporting, to the network node, a measurement value for each of the one or more sets of time and frequency resources, the measurement value indicative of cross-link interference at the UE due to transmissions by the one or more different UEs; and
receiving scheduling information from the network node, wherein the scheduling information is based upon scheduling the one or more different UEs such that an amount of cross-link interference at the UE is reduced.

2. The method of claim 1, wherein performing one or more measurements on each of the one or more sets of time and frequency resources comprises:
performing a Received Signal Strength Indicator (RSSI) measurement on each of the one or more sets of time and frequency resources.

3. The method of claim 2, wherein:
the RSSI measurement comprises a set of measurements performed over a set of slots, each slot carrying one of the one or more time and frequency resource sets; and
the reported measurement value comprises a set of measurements with one reported RSSI value per slot.

4. The method of claim 2, wherein:
the RSSI measurement comprises a measurement performed over a set of time and frequency resources that spans multiple slots; and
the reported measurement value comprises an averaged measurement over the multiple slots.

5. The method of claim 2, wherein:
the RSSI measurement comprises a measurement performed over a set of time and frequency resources that occurs in a pre-configured set of slots; and the reported measurement value comprises a measured value for a slot in the pre-configured set of slots if the measured value satisfies a reporting trigger.

6. The method of claim 1, wherein the obtained indication of one or more sets of time and frequency resources to be measured by the UE comprises one or more of:
 a sub-band index;
 a comb number corresponding to a set of time and frequency resources in a sub-band;
 a set of Orthogonal Frequency Division Multiplexing (OFDM) symbols in a slot; and
 a set of slots.

7. The method of claim 6, comprising deriving the one or more sets of time and frequency resources to be measured by the UE based on the obtained indication.

8. The method of claim 1, further comprising:
 obtaining a configuration for a Sounding Reference Signal (SRS) transmission by the UE; and
 transmitting the SRS according to the obtained configuration.

9. A method in a network node, comprising:
 configuring a first user equipment (UE) to perform one or more measurements on one or more sets of time and frequency resources, wherein:
  the one or more sets of time and frequency resources comprises time and frequency resources with regular spacings and are time and frequency resources in which one or more different UEs, in one or more cells different from the UE's cell, are configured to transmit a signal;
  configuring the first UE comprises indicating one or more of a sub-band index and a comb number corresponding to the one or more sets of times and frequency resources to perform the one or more measurements;
 receiving a measurement value from the first UE for each of the one or more sets of time and frequency resources, the measurement value indicative of cross-link interference at the first UE due to transmissions by the one or more different UEs; and
 scheduling the one or more different UEs such that an amount of cross-link interference at the first UE is reduced.

10. The method of claim 9, further comprising:
 receiving, from a neighboring network node, an SRS transmission configuration for the one or more different UEs, the SRS transmission configuration indicating that the one or more different UEs are configured to perform SRS transmissions on the one or more sets of time and frequency resources, wherein:
  the first UE is configured to perform one or more measurements on the one or more sets of time and frequency resources according to the received SRS transmission configuration.

11. The method of claim 9, comprising:
 estimating, based on the received measurement value, an amount of cross-link interference at the first UE due to transmissions by the one or more different UEs.

12. The method of claim 9, wherein configuring the first UE to perform one or more measurements on the one or more sets of time and frequency resources comprises:
 signaling an indication of the one or more sets of time and frequency resources to be measured by the first UE.

13. The method of claim 12, wherein the indication comprises one or more of:
 a sub-band index;
 a comb number corresponding to a set of time and frequency resources in a sub-band;
 a set of Orthogonal Frequency Division Multiplexing (OFDM) symbols in a slot; and
 a set of slots.

14. The method of claim 9, wherein:
 configuring the first UE to perform one or more measurements on the one or more sets of time and frequency resources comprises configuring the first UE to perform a set of measurements over a set of slots, each slot carrying one of the one or more time and frequency resource sets; and
 the received measurement value comprises a set of measurements with one reported RSSI value per slot.

15. The method of claim 9, wherein:
 configuring the first UE to perform one or more measurements on the one or more sets of time and frequency resources comprises configuring the first UE to perform a measurement over a set of time and frequency resources that spans multiple slots; and
 the received measurement value comprises an averaged measurement over the multiple slots.

16. A user equipment (UE), comprising:
 a receiver;
 a transmitter; and
 processing circuitry coupled to the receiver and the transmitter, the processing circuitry configured to:
  obtain, from a network node, an indication of one or more sets of time and frequency resources to be measured by the UE, wherein:
   the one or more sets of time and frequency resources comprises time and frequency resources with regular spacings and are time and frequency resources in which one or more different UEs, in one or more cells different from the UE's cell, are configured to transmit a signal;
   the indication comprises one or more of a sub-band index and a comb number corresponding to the one or more sets of times and frequency resources; and
  perform one or more measurements on each of the one or more sets of time and frequency resources;
  report, to the network node, a measurement value for each of the one or more sets of time and frequency resources, the measurement value indicative of cross-link interference at the UE due to transmissions by one or more different UEs; and
  receive scheduling information from the network node, wherein the scheduling information is based upon scheduling the one or more different UEs such that an amount of cross-link interference at the UE is reduced.

17. The UE of claim 16, wherein the processing circuitry configured to perform one or more measurements on each of the one or more sets of time and frequency resources comprises processing circuitry configured to:
 perform a Received Signal Strength Indicator (RSSI) measurement on each of the one or more sets of time and frequency resources.

18. The UE of claim 17, wherein:
 the RSSI measurement comprises a set of measurements performed over a set of slots, each slot carrying one of the one or more time and frequency resource sets; and the reported measurement value comprises a set of measurements with one reported RSSI value per slot.

19. The UE of claim 17, wherein:
the RSSI measurement comprises a measurement performed over a set of time and frequency resources that spans multiple slots; and
the reported measurement value comprises an averaged measurement over the multiple slots.

20. The UE of claim 17, wherein:
the RSSI measurement comprises a measurement performed over a set of time and frequency resources that occurs in a pre-configured set of slots; and
the reported measurement value comprises a measured value for a slot in the pre-configured set of slots if the measured value satisfies a reporting trigger.

21. The UE of claim 16, wherein the obtained indication of one or more sets of time and frequency resources to be measured by the UE comprises one or more of:
a sub-band index;
a comb number corresponding to a set of time and frequency resources in a sub-band;
a set of Orthogonal Frequency Division Multiplexing (OFDM) symbols in a slot; and
a set of slots.

22. A network node, comprising:
a receiver;
a transmitter; and
processing circuitry coupled to the receiver and the transmitter, the processing circuitry configured to:
configure a first user equipment (UE) to perform one or more measurements on one or more sets of time and frequency resources, wherein:
the one or more sets of time and frequency resources comprises time and frequency resources with regular spacings and are time and frequency resources in which one or more different UEs, in one or more cells different from the UE's cell, are configured to transmit a signal;
configuring the first UE comprises indicating one or more of a sub-band index and a comb number corresponding to the one or more sets of times and frequency resources to perform the one or more measurements; and
receive a measurement value from the first UE for each of the one or more sets of time and frequency resources, the measurement value indicative of cross-link interference at the first UE due to transmissions by the one or more different UEs; and
schedule the one or more different UEs such that an amount of cross-link interference at the first UE is reduced.

23. The network node of claim 22, wherein the processing circuitry is further configured to configure the one or more different UEs to transmit a signal on the one or more sets of time and frequency resources.

24. The network node of claim 23, wherein the processing circuitry is further configured to configure the one or more different UEs to transmit a Sounding Reference Signal (SRS).

25. The network node of claim 22, wherein the processing circuitry is further configured to:
receive, from a neighboring network node, an SRS transmission configuration for the one or more different UEs, the SRS transmission configuration indicating that the one or more different UEs are configured to perform SRS transmissions on the one or more sets of time and frequency resources, wherein:
the first UE is configured to perform one or more measurements on the one or more sets of time and frequency resources according to the received SRS transmission configuration.

* * * * *